United States Patent
Nagai et al.

(10) Patent No.: US 12,392,689 B2
(45) Date of Patent: Aug. 19, 2025

(54) ONLINE SAMPLING SYSTEM

(71) Applicant: SHIMADZU CORPORATION, Kyoto (JP)

(72) Inventors: Yusuke Nagai, Kyoto (JP); Yosuke Iwata, Kyoto (JP); Tomoyuki Yamazaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 296 days.

(21) Appl. No.: 18/132,371

(22) Filed: Apr. 8, 2023

(65) Prior Publication Data

US 2023/0324261 A1 Oct. 12, 2023

(30) Foreign Application Priority Data

Apr. 11, 2022 (JP) ................................ 2022-064942

(51) Int. Cl.
  *G01N 30/20* (2006.01)
  *G01N 1/14* (2006.01)
  *G01N 1/20* (2006.01)

(52) U.S. Cl.
  CPC ............. *G01N 1/2035* (2013.01); *G01N 1/14* (2013.01); *G01N 2001/205* (2013.01)

(58) Field of Classification Search
  CPC .. G01N 1/2035; G01N 1/14; G01N 2001/205; G01N 30/24; G01N 2001/002;
  (Continued)

(56) References Cited

U.S. PATENT DOCUMENTS

| 4,057,997 A * | 11/1977 | Chandler | ............... G01N 30/06 |
| | | | 73/864.83 |
| 2016/0195564 A1* | 7/2016 | Hewitson | ............... G01N 30/06 |
| | | | 422/63 |
| 2019/0101513 A1* | 4/2019 | Phoebe | .............. G01N 30/8696 |

FOREIGN PATENT DOCUMENTS

| JP | S6219758 A | * | 1/1987 | |
| JP | 2021063835 A | | 4/2021 | |
| WO | WO-2020168156 A1 | * | 8/2020 | ............. B01D 15/14 |

* cited by examiner

*Primary Examiner* — Robert R Raevis
(74) *Attorney, Agent, or Firm* — Renner, Otto, Boisselle & Sklar, LLP

(57) ABSTRACT

It is an object to enable a sample of a sample source to be injected into a LC while a pressure state of the sample source is maintained. There are provided an injector (2) including a first sample loop (18) and an injection valve (20), a sample supply channel (26), a pump part (4), a second sample loop (12), a sample source channel (52), and a path construction part. The path construction part is configured to be capable of selectively constructing a sampling path and a sample supply path. The sampling path is configured so that the sample source channel (52) and the pump part (4) are fluidly connected to each other in a closed system with the second sample loop (12) interposed therebetween and the sample is drawn from the sample source to the second sample loop (12) using the pump part (4), and the sample supply path is configured so that the second sample loop (12) is separated from the sample source channel (52) while maintaining a closed system state of the sample source channel (52) and the pump part (4) or another pump (40) different from the pump part and the sample supply channel (26) are fluidly connected to each other with the second sample loop (12) interposed therebetween and the sample held in the second sample loop (12) is supplied to the injector (2) through the (Continued)

sample supply channel (26) using the pump part (4) or the other pump (40).

10 Claims, 19 Drawing Sheets

(58) Field of Classification Search
CPC ....... G01N 2001/105; G01N 2030/202; G01N 30/20; G01N 2030/201; G01N 30/22; G01N 2030/207
USPC ........... 73/61.52, 61.55, 61.56, 61.59, 64.56, 73/863.86, 864.21, 864.22, 864.81; 134/22.11, 22.12; 210/656, 198.2; 422/70
See application file for complete search history.

FIG. 6  INJECTION OF SAMPLE INTO MOBILE PHASE

ONLINE SAMPLING SYSTEM

BACKGROUND OF THE INVENTION

1. Field of the Invention

The present invention relates to an online sampling system that takes a sample from a sample source and injects it online during a mobile phase in a liquid chromatograph (referred to below as an LC).

2. Description of the Related Art

LC is an analysis technique that is not only used in various fields such as pharmaceutical production, food production, and chemistry, but also widely used from upstream (research and development) to downstream (manufacturing and quality control) processes. The LC is used in adoption of process analytical technology (PAT) and use of the PAT is promoted in manufacturing and quality control processes to check whether required product quality is ensured by monitoring a manufacturing process automatically and continuously as much as possible. Introduction of the PAT not only enhances reliability and robustness of a manufacturing process, but also achieves cost reduction effect. Thus, introduction of the PAT has progressed in the petroleum and chemical industries, and the pharmaceutical and electronic industries also have studied introduction of the PAT.

An online monitoring system using an LC, in which a flow vial is used, is known (see JP 2021-063835 A). The system using the flow vial is configured such that the flow vial is disposed in an autosampler of the LC, and the autosampler injects a sample supplied to the flow vial from a sample source into the LC.

SUMMARY OF THE INVENTION

When a system using a flow vial starts to monitor a manufacturing process under high pressure, a sample source under high pressure is to be fluidly connected to the flow vial to increase pressure in the flow vial. However, a needle of the autosampler penetrates a septum of the flow vial when the sample supplied to the flow vial is injected into the LC, so that the system from the sample source to the flow vial cannot be said to be a completely closed system. As a result, the sample source is less likely to be maintained in a required high pressure state, so that reaction of the sample in the manufacturing process may be affected.

The present invention is made in view of the above problems, and an object thereof is to enable a sample of a sample source to be injected into an LC while a pressure state of the sample source is maintained.

An online sampling system according to the present invention is configured to collect a sample from a sample source and to inject the sample into a mobile phase flowing through an analysis channel of an LC, the online sampling system including:
- an injector including a first sample loop for temporarily holding a sample and an injection valve for switching between a state in which the first sample loop is incorporated in the analysis channel and a state in which the first sample loop is separated from the analysis channel;
- a sample supply channel fluidly connected to the injector and configured to supply the sample to the injector;
- a pump part configured to suck and discharge a liquid;
- a second sample loop provided separately from the first sample loop;
- a sample source channel communicating with the sample source;
- a path construction part including one or more switching valves, the path construction part being configured to selectively build multiple fluid flow paths in the online sampling system by switching the one or more switching valves.

The path construction part is configured to be capable of selectively constructing a sampling path and a sample supply path,
- the sampling path is configured so that the sample source channel and the pump part are fluidly connected to each other in a closed system with the second sample loop interposed therebetween to draw a sample from the sample source to the second sample loop using the pump part, and
- the sample supply path is configured so that the second sample loop is separated from the sample source channel while maintaining a closed system state of the sample source channel and the pump part or another pump different from the pump part and the sample supply channel are fluidly connected to each other with the second sample loop interposed therebetween and the sample held in the second sample loop is supplied to the injector through the sample supply channel using the pump part or the other pump.

Here, the term, "closed system", means a system including no place through which a fluid can flow between the inside and the outside of the system, and an internal space formed to be completely closed. The phase, "maintaining the closed system state of the sample source channel", means that the closed system state in the system including the sample source channel is always maintained before and after a connection destination of the sample source channel is switched.

The online sampling system according to the present invention enables supplying a sample of the sample source to the injector to inject the sample into the LC while maintaining a pressure state of the sample source because of including the second sample loop separately from the first sample loop provided in the injector configured to inject a sample into the LC, and capable of selectively constructing the sampling path being a closed system configured to draw a sample from the sample source to the second sample loop through the sample source channel, and the sample supply path configured to separate the second sample loop from the sample source channel and fluidly connect the second sample loop to the injector while maintaining the closed system state of the sample source channel, thereby feeding the sample held in the second sample loop to the injector.

DETAILED DESCRIPTION OF THE INVENTION

Figure 1:
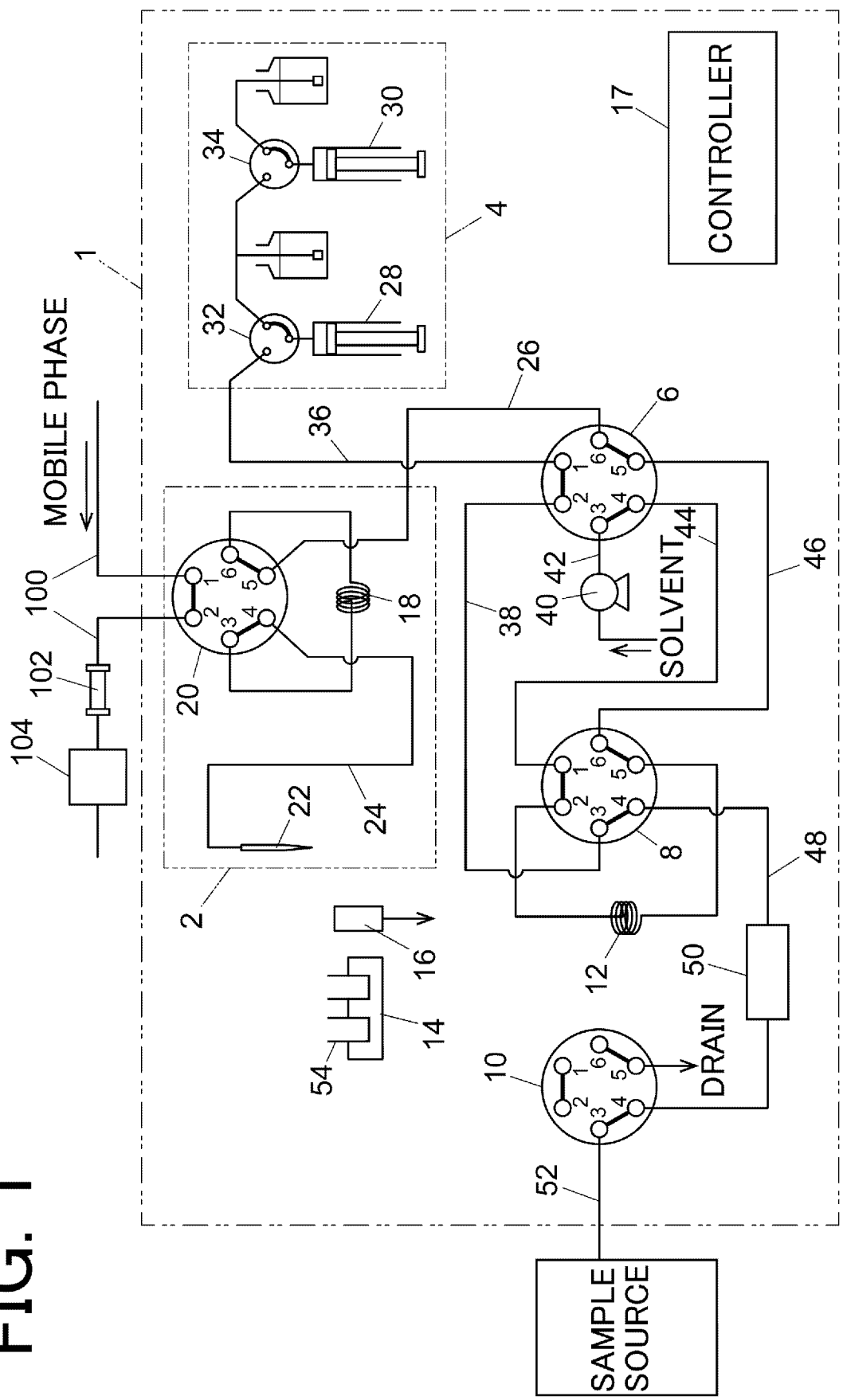
FIG. 1 is a channel configuration diagram illustrating an example of an online sampling system.

Hereinafter, an embodiment of an online sampling system according to the present invention will be described with reference to the drawings.

An online sampling system 1 of the present example includes an injector 2, a pump part 4, switching valves 6, 8, and 10, a sample loop 12 (second sample loop), a container part 14, a drain port 16, and a controller 17.

The injector 2 is for injecting a sample into a mobile phase flowing through an analysis channel 100 of an LC including a separation column 102, a detector 104, and the like. The injector 2 includes a sample loop 18 (first sample loop) for temporarily holding a sample, an injection valve 20 for switching between a state in which the sample loop 18 is incorporated in the analysis channel 100 and a state in which the sample loop is separated from the analysis channel 100, and a sampling channel 24 provided at its tip with a needle 22 that three-dimensionally moves. The injection valve 20 is a two-position valve in which six ports 1 to 6 are arranged counterclockwise. The ports 1 and 2 adjacent to each other of the injection valve 20 are fluidly connected to an upstream channel and a downstream channel of the analysis channel 100, respectively. The ports 3 and 6 of the injection valve 20 are fluidly connected to one end and the other end of the sample loop 18, respectively. The port 4 of the injection valve 20 is fluidly connected to the sampling channel 24, and the port 5 adjacent to the port 4 is connected to one end of a sample supply channel 26. The other end of the sample supply channel 26 is fluidly connected to a port 6 of a switching valve 6. The sample supply channel 26 is for supplying a sample to the injector 2.

The pump part 4 is fluidly connected to a port 1 of the switching valve 6 via a pump channel 36. The pump part 4 includes two syringe pumps 28 and 30, and two 3-port valves 32 and 34. The syringe pumps 28 and 30 are different in cylinder capacity from each other. The pump part 4 allows one of the syringe pumps 28 and 30 to be fluidly connected to the pump channel 36 using the 3-port valves 32 and 34. The pump part 4 also can supply a cleaning liquid from any one of the syringe pumps 28 and 30 through the pump channel 36. The pump part 4 does not necessarily include two syringe pumps, and may include only one syringe pump.

The container part 14 is configured to allow multiple containers 54 to be set. Examples of a container 54 set in the container part 14 include an empty container that can be used for diluting a sample, and a sample container that stores a sample. The drain port 16 allows access of the needle 22 to discharge a liquid ejected from the needle 22 to a drain. The needle 22 of the injector 2 is accessible to any container 54 set in the container part 14 and the drain port 16.

Each of the switching valves 6, 8 and 10 is a two-position valve including six ports 1 to 6 counterclockwise.

The port 2 of the switching valve 6 is fluidly connected to the port 3 of the switching valve 8 via a channel 38, the port 4 of the switching valve 6 is fluidly connected to the port 1 of the switching valve 8 via a channel 44, and the port 5 of the switching valve 6 is fluidly connected to the port 6 of the switching valve 8 via a channel 46. The port 3 of the switching valve 6 is connected to a solvent supply channel 42 including a liquid feed pump 40 provided separately from the pump part 4. The liquid feed pump 40 can supply a solvent through the solvent supply channel 42.

The ports 2 and 5 of the switching valve 8 are fluidly connected one end and the other end of the sample loop 12, respectively. The port 4 of the switching valve 8 is fluidly connected to a port 4 of a switching valve 10 via a pretreatment channel 48. The pretreatment channel 48 is provided with a pretreatment part 50. The pretreatment part 50 is configured to apply pretreatment to a sample drawn into the sample loop 12 from a sample source. Examples of the pretreatment part 50 include a filter for removing unnecessary substances in a sample, a remelting device for remelting a sample precipitated in a channel, and the like. Conceivable examples of the remelting device include a device that generates ultrasonic waves, low-frequency vibrations, heat, an electric field, or a magnetic field.

The switching valve 10 includes ports 1, 2, and 6 that are each a closed port. The switching valve 10 includes a port 3 that is fluidly connected to a sample source channel 52 communicating with the sample source.

The switching valves 6, 8, and 10 constitute a path construction part for constructing various fluid flow paths in the online sampling system 1. The fluid flow path constructed by the path construction part including the switching valves 6, 8, and 10 will be described below.

Figure 2:
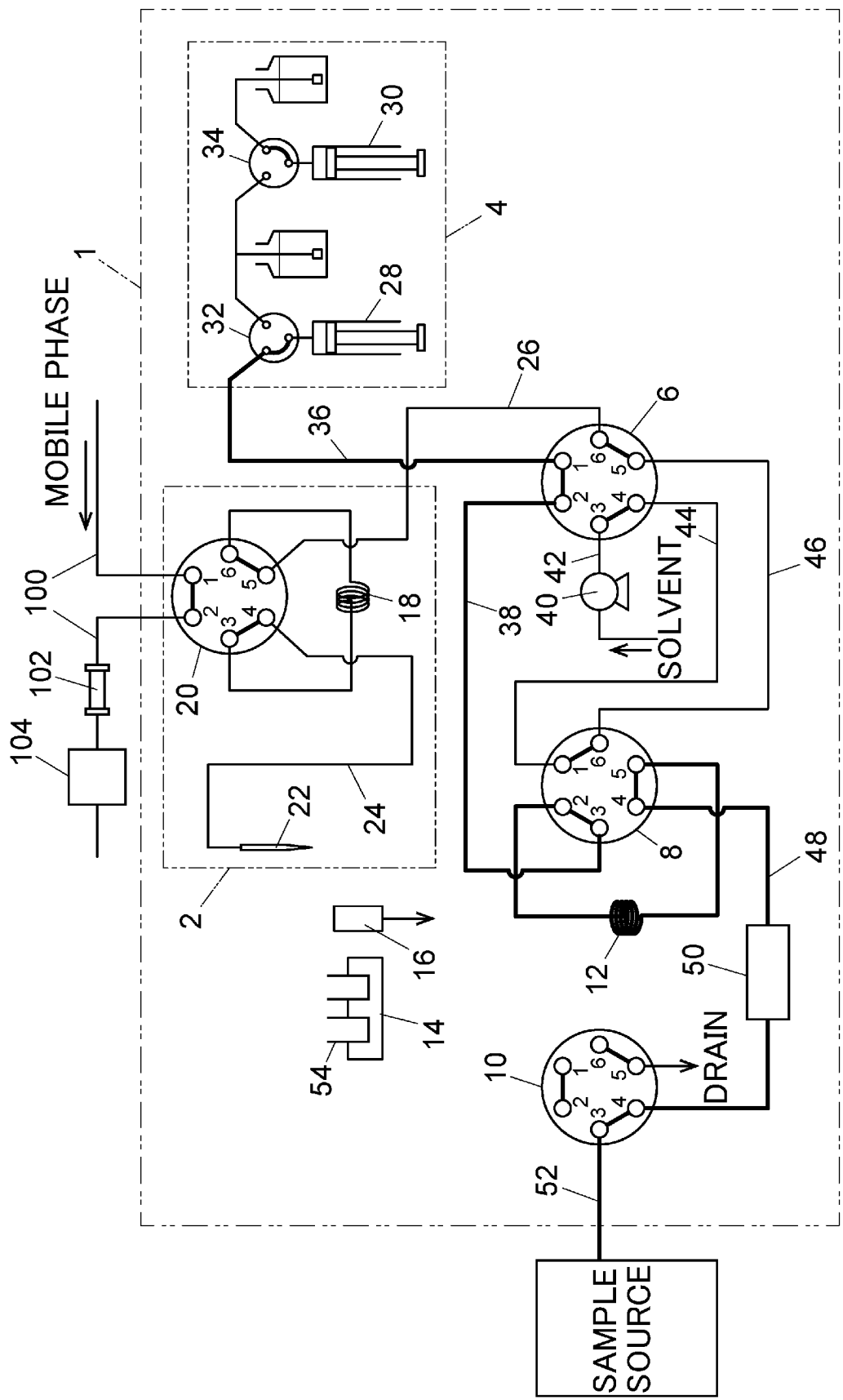
FIG. 2 is a diagram illustrating an example of a channel configuration when a sampling path is constructed in the example.

As illustrated in FIG. 2, the pump part 4 and the sample source channel 52 are fluidly connected to each other in a closed system with the sample loop 12 interposed therebetween in states as follows: the switching valve 6 includes the ports 1 and 2 fluidly communicating with each other; the switching valve 8 includes the ports 2 and 3 fluidly communicating with each other, and the ports 4 and 5 fluidly communicating with each other; and the switching valve 10 includes the ports 3 and 4 fluidly communicating with each other. When any syringe pump (syringe pump 28 in the drawing) of the pump part 4 is driven to perform sucking in these states, a sample of the sample source is drawn into the sample loop 12 through the sample source channel 52 and the pretreatment channel 48. That is, bringing the switching valves 6, 8, and 10 into the state of FIG. 2 constructs a sampling path for drawing the sample of the sample source into the sample loop 12 with the pump part 4. When the sampling path is constructed, the sample source channel 52 to the pump part 4 are in a closed system. Thus, pressure in the sample source 52 can be maintained with no reduction.

Figure 3:
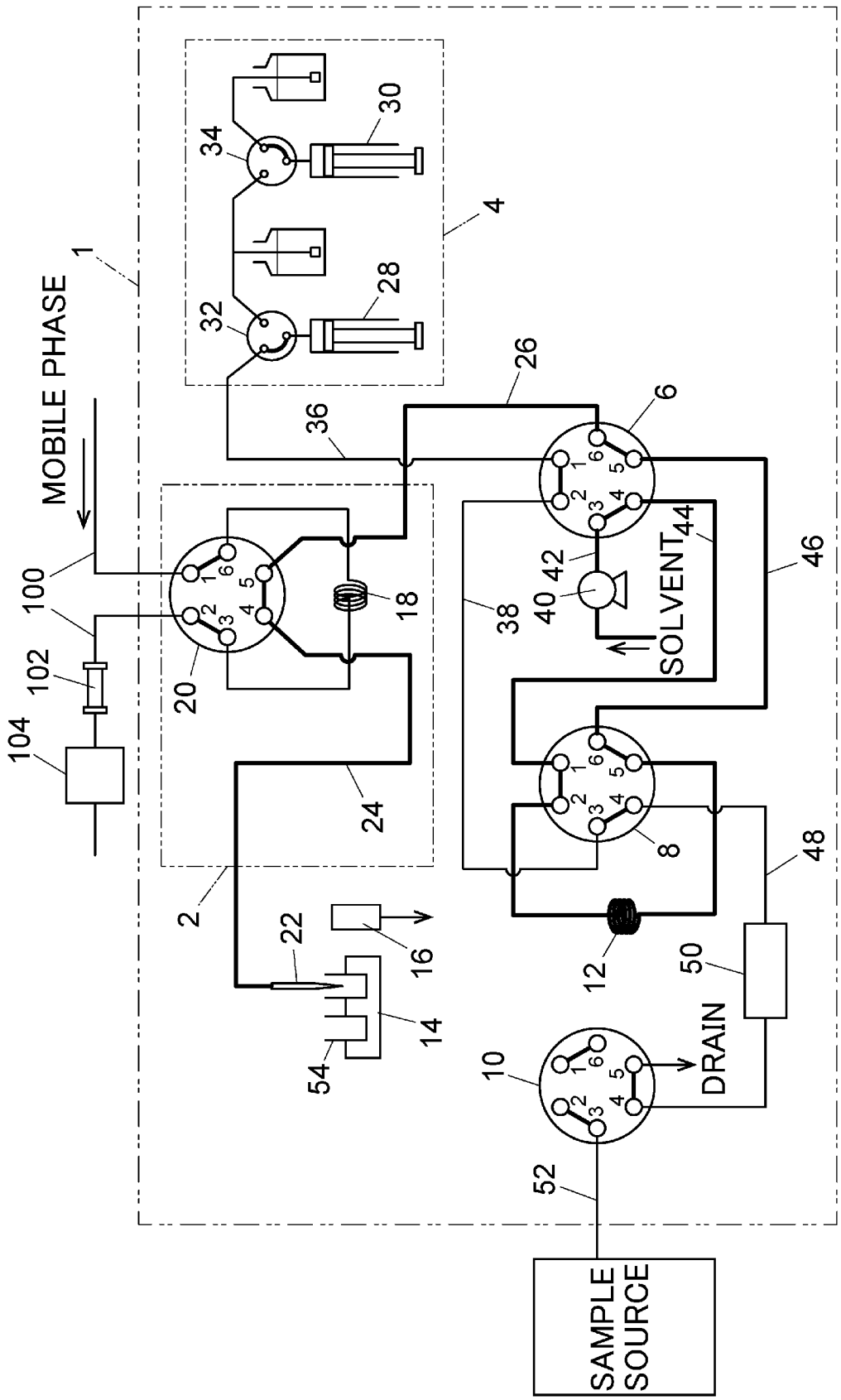
FIG. 3 is a diagram illustrating an example of a channel configuration when a sample supply path is constructed in the example.

As illustrated in FIG. 3, the solvent supply channel 42 and the sample supply channel 26 are fluidly connected to each other with the sample loop 12 interposed therebetween in states as follows: the switching valve 6 includes the ports 3 and 4 fluidly communicating with each other and the ports 5 and 6 fluidly communicating with each other; and the switching valve 8 includes the ports 1 and 2 fluidly communicating with each other, and the ports 5 and 6 fluidly communicating with each other. Feeding a solvent with the liquid feed pump 40 in these states causes the sample held in the sample loop 12 to be supplied to the injector 2 together with the solvent from the liquid feed pump 40. That is, bringing the switching valves 6, 8, and 10 into the state of FIG. 3 constructs a sample supply path for supplying the sample held in the sample loop 12 to the injector 2 with the liquid feed pump 40. At this time, the ports 4 and 5 of the injection valve 20 of the injector 2 is caused to fluidly communicate with each other and the needle 22 is caused to access the container 54 being empty set in the container 14, so that the sample and the solvent supplied to the injector 2 through the sample supply channel 26 can be stored in the container 54, and the sample can be diluted in the container 54. The sample has a dilution rate that can be adjusted by a liquid feed flow rate of the liquid feed pump 40.

FIG. 3 illustrates a state in which the port 3 of the switching valve 10, which is fluidly connected to the sample source channel 52, fluidly communicates with the closed port 2 when the sample supply path is constructed, the state causing a closed system state to be maintained even after the sample source channel 52 is disconnected from the sample loop 12. Even when the ports 3 and 4 of the switching valve 10 fluidly communicate with each other in a state where the sample supply path is constructed, the closed system state in the system including the sample source can be maintained.

Figure 4:
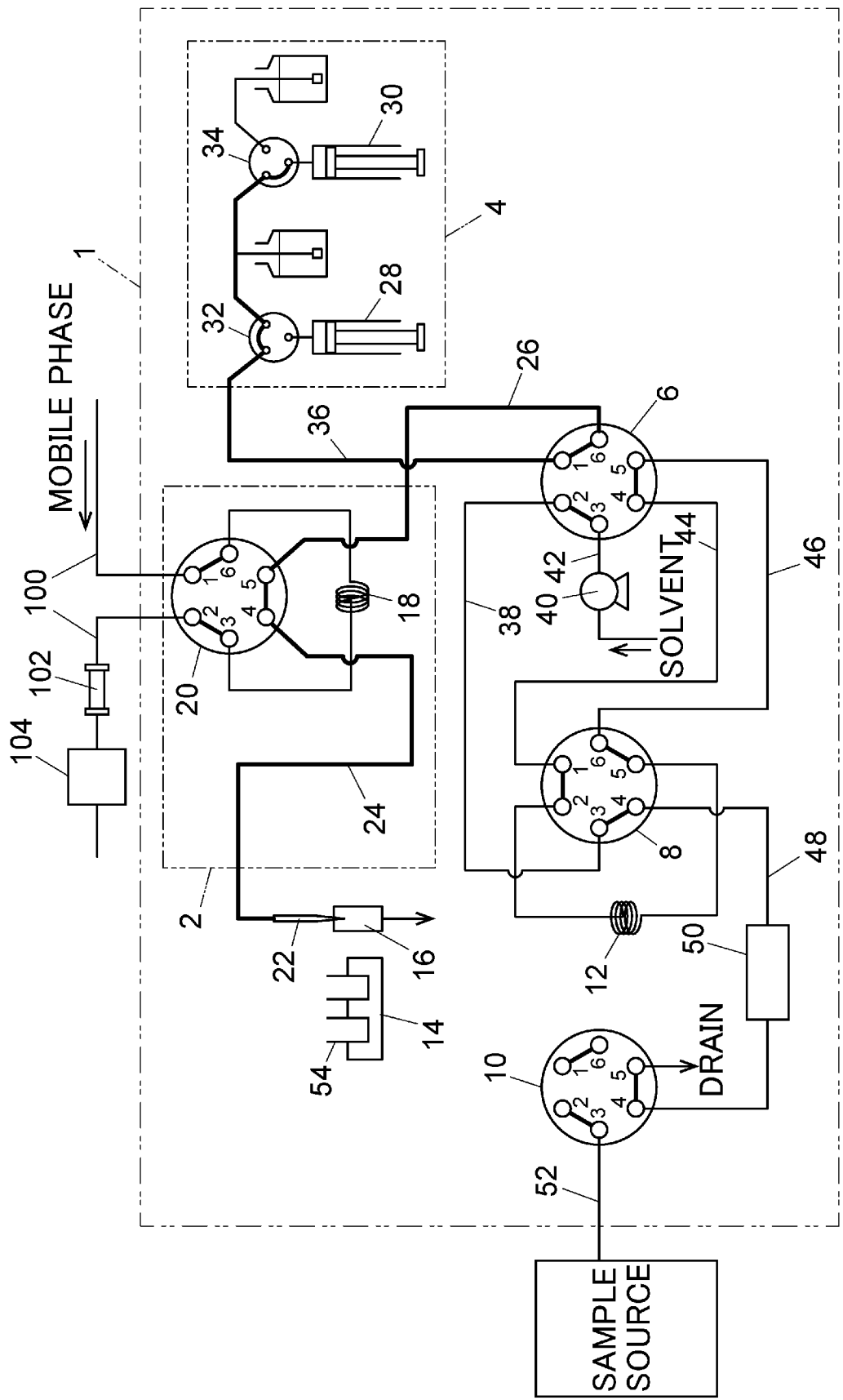
FIG. 4 is a diagram illustrating an example of a channel configuration when a diluted sample is drawn into a first sample loop in the example.

When the ports 1 and 6 of the switching valve 6 are caused to fluidly communicate with each other as illustrated in FIG. 4, the pump part 4 is fluidly connected to the sampling channel 24, and thus constructing a sucking and discharging path for sucking and discharging a fluid with the pump part 4 via the needle 22. FIG. 4 illustrates an example in which the needle 22 is caused to access the drain port 16. When any of the syringe pumps (syringe pump 30 in the drawing) of the pump part 4 supplies a cleaning liquid in this state, the inside of a channel from the pump part 4 to the needle 22 can be cleaned.

Figure 5:
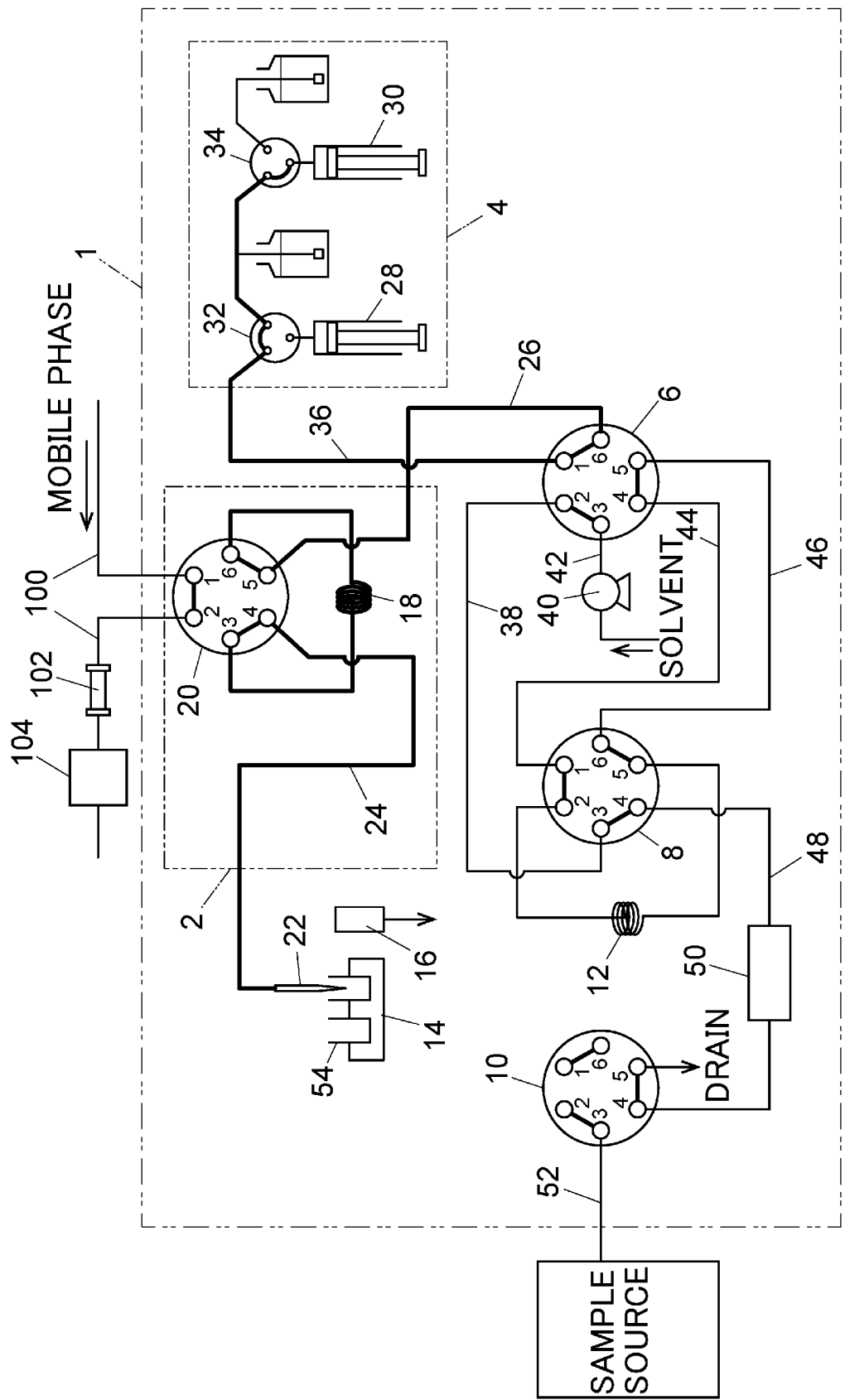
FIG. 5 is a diagram illustrating an example of a channel configuration when a cleaning liquid is fed from a pump part to clean the inside of a channel.

When the injection valve 20 of the injector 2 is caused to allow the ports 3 and 4 to fluidly communicate with each other, and the ports 5 and 6 to fluidly communicate with each other, as illustrated in FIG. 5, the sample loop 18 can be incorporated in the sucking and discharging path. When the needle 22 is caused to access the container 54 storing the diluted sample, and any syringe pump (the syringe pump 30 in the drawing) of the pump part 4 is driven to perform sucking, in this state, the sample in the container 54 can be drawn into the sample loop 18.

Figure 6:
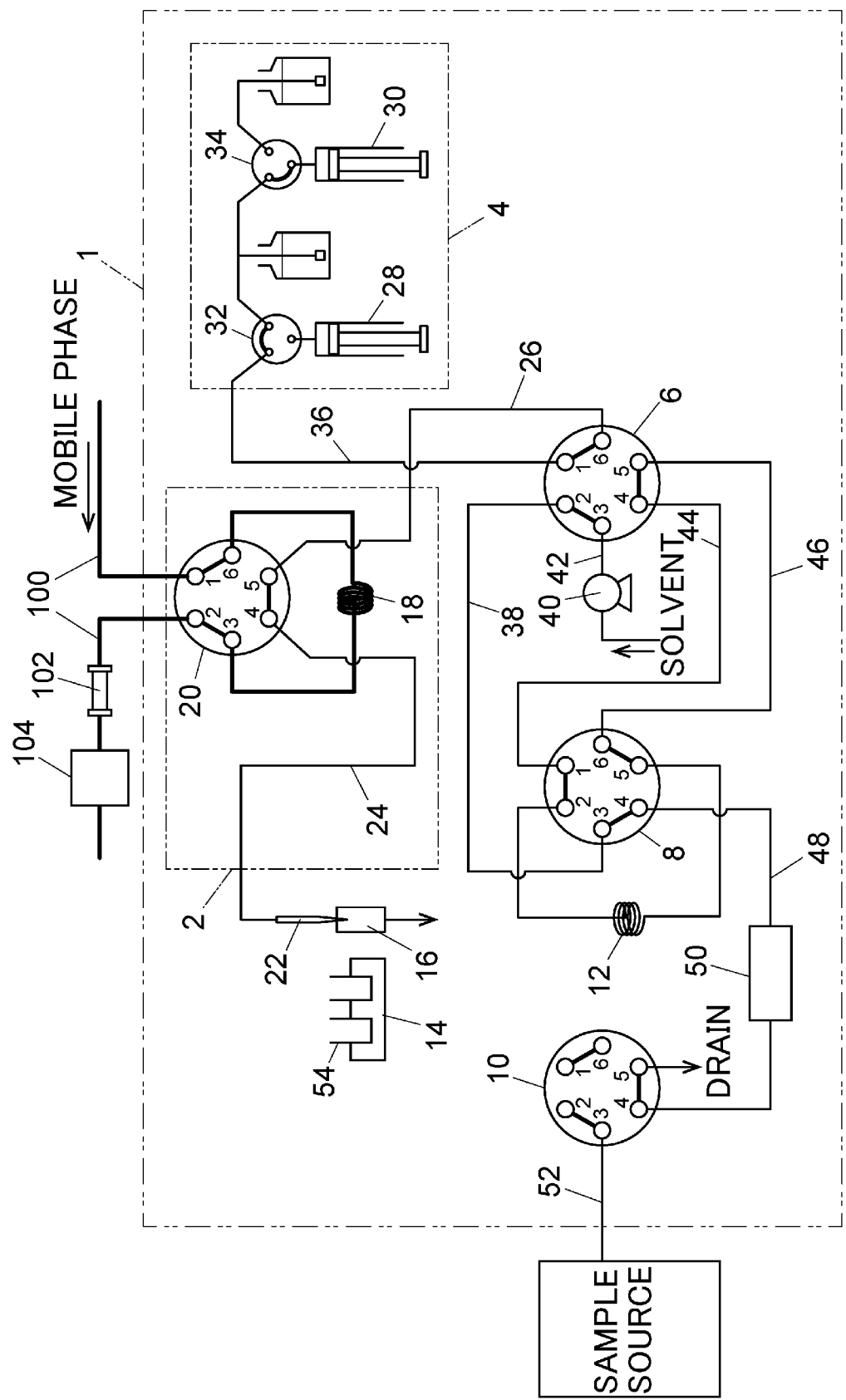
FIG. 6 is a diagram illustrating an example of a channel configuration when a sample held in a first sample loop is injected into a mobile phase of an LC.

When the injection valve 20 of the injector 2 is caused to allow the ports 1 and 6 to fluidly communicate with each other, and the ports 2 and 3 to fluidly communicate with each other to incorporate the sample loop 18 into the analysis channel 100 after the sample is drawn into the sample loop 18, as illustrated in FIG. 6, the sample held in the sample loop 18 can be injected into the mobile phase of the LC.

Besides the above, the path construction part including the switching valves 6, 8, and 10 can construct various cleaning paths.

Figure 7:
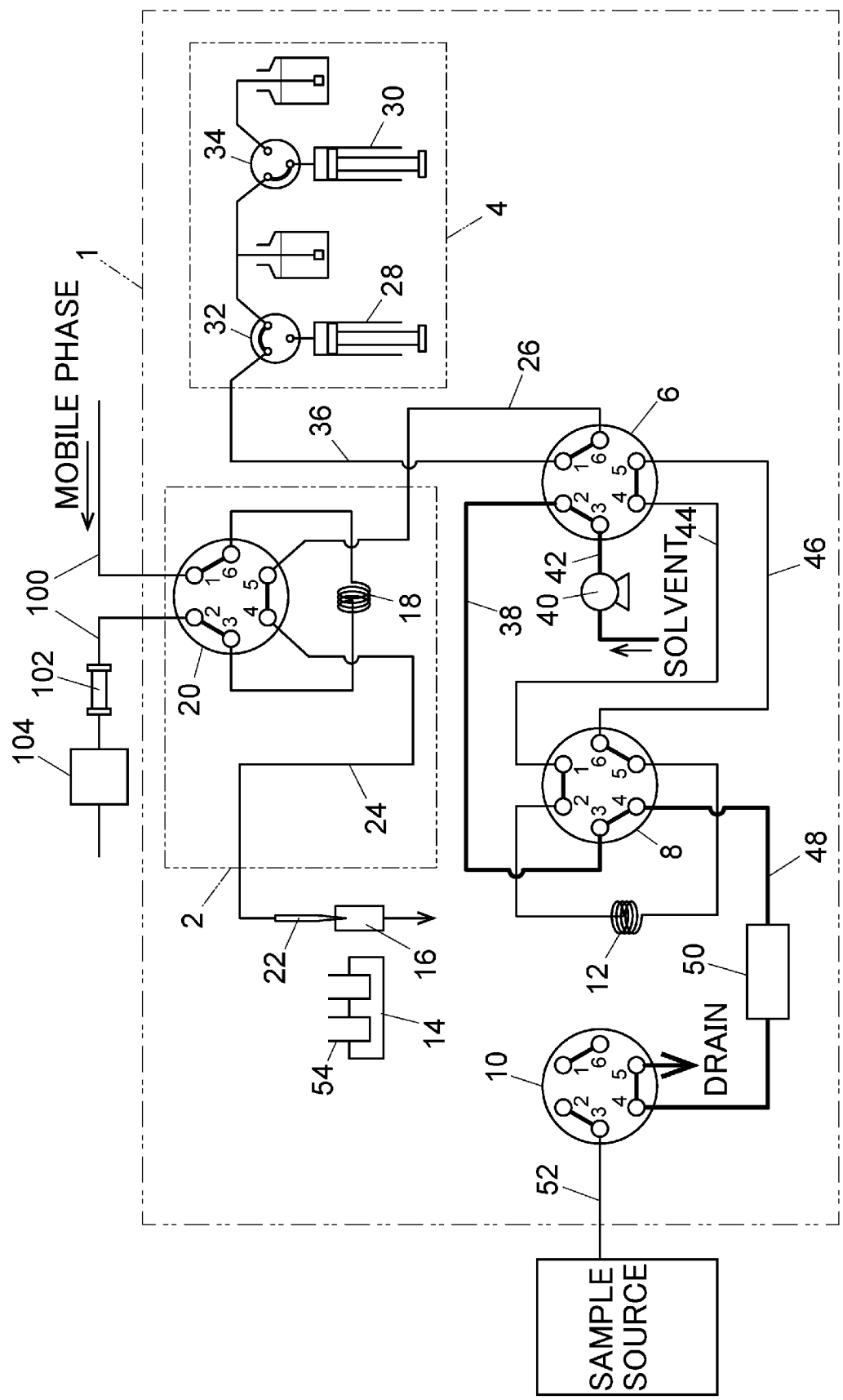
FIG. 7 is a diagram illustrating an example of a channel configuration when a pretreatment part cleaning path is constructed in the example.

As illustrated in FIG. 7, a pretreatment part cleaning path is constructed in which the solvent supply channel 42, the pretreatment channel 48, and the drain are fluidly connected in series when the ports 2 and 3 of the switching valve 6 are caused to fluidly communicate with each other, the ports 3 and 4 of the switching valve 8 are caused to fluidly communicate with each other, and the ports 4 and 5 of the switching valve 10 are caused to fluidly communicate with each other. Construction of such a pretreatment part cleaning path enables the pretreatment part 50 on the pretreatment channel 48 to be cleaned with the solvent from the liquid feed pump 40.

Figure 8:
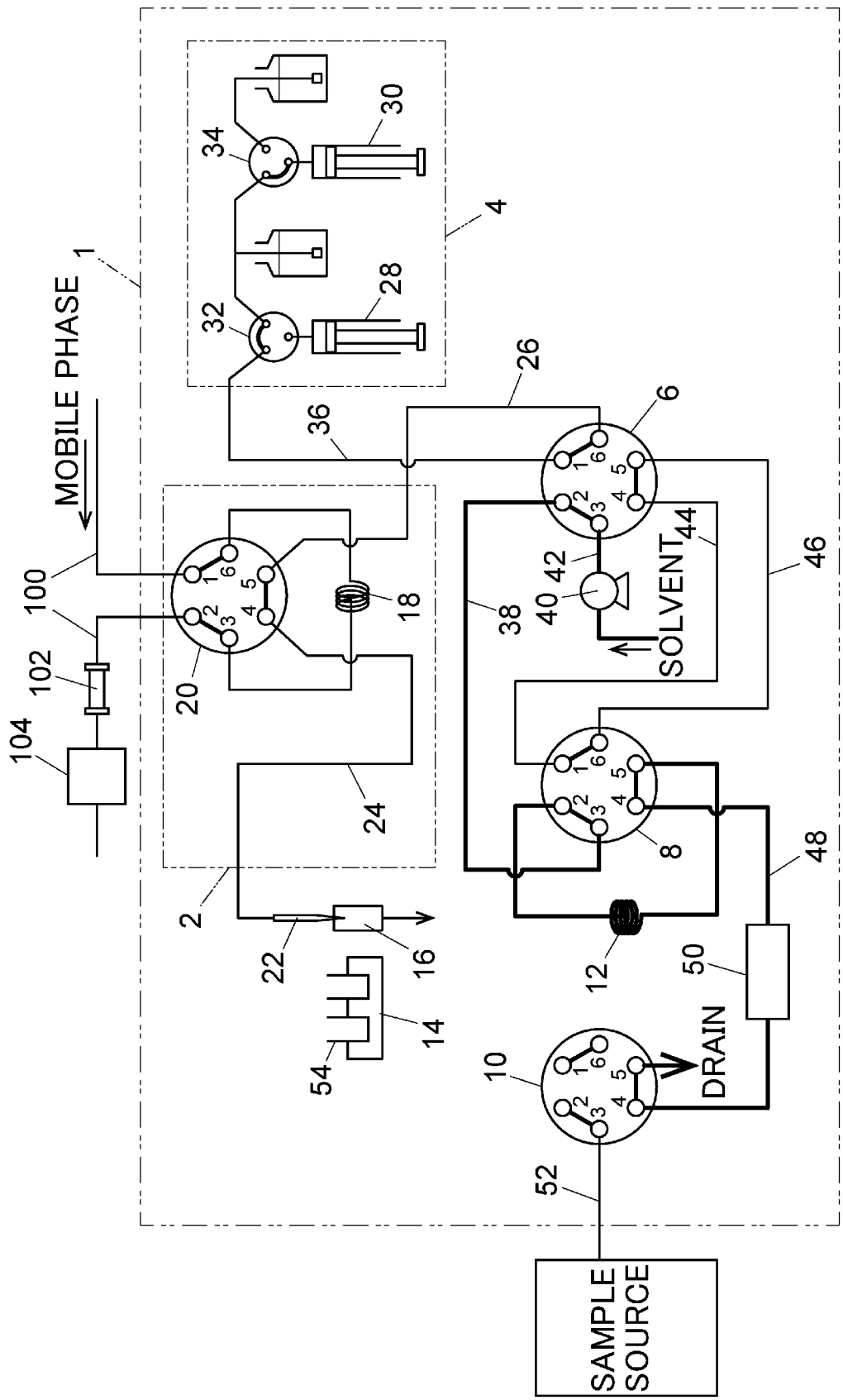
FIG. 8 is a diagram illustrating another example of a channel configuration when a pretreatment part cleaning path is constructed in the example.

As illustrated in FIG. 8, a pretreatment part cleaning path is constructed in which the solvent supply channel 42, the sample loop 12, the pretreatment channel 48, and the drain are fluidly connected in series when the ports 2 and 3 of the switching valve 6 are caused to fluidly communicate with each other, the ports 2 and 3 of the switching valve 8, and the ports 4 and 5 thereof are caused to fluidly communicate with each other, and the ports 4 and 5 of the switching valve 10 are caused to fluidly communicate with each other. The pretreatment part cleaning path of FIG. 8 enables the pretreatment channel 48 and the inside of the sample loop 12 to be cleaned with the solvent from the liquid feed pump 40.

The pretreatment part cleaning path as illustrated in FIGS. 7 and 8 enables the solvent to flow in a direction opposite to a flow of the sample when the sample is drawn from the sample source to the sample loop 12 in the pretreatment part 50, so that a high cleaning effect of the pretreatment part 50 can be obtained.

Figure 9:
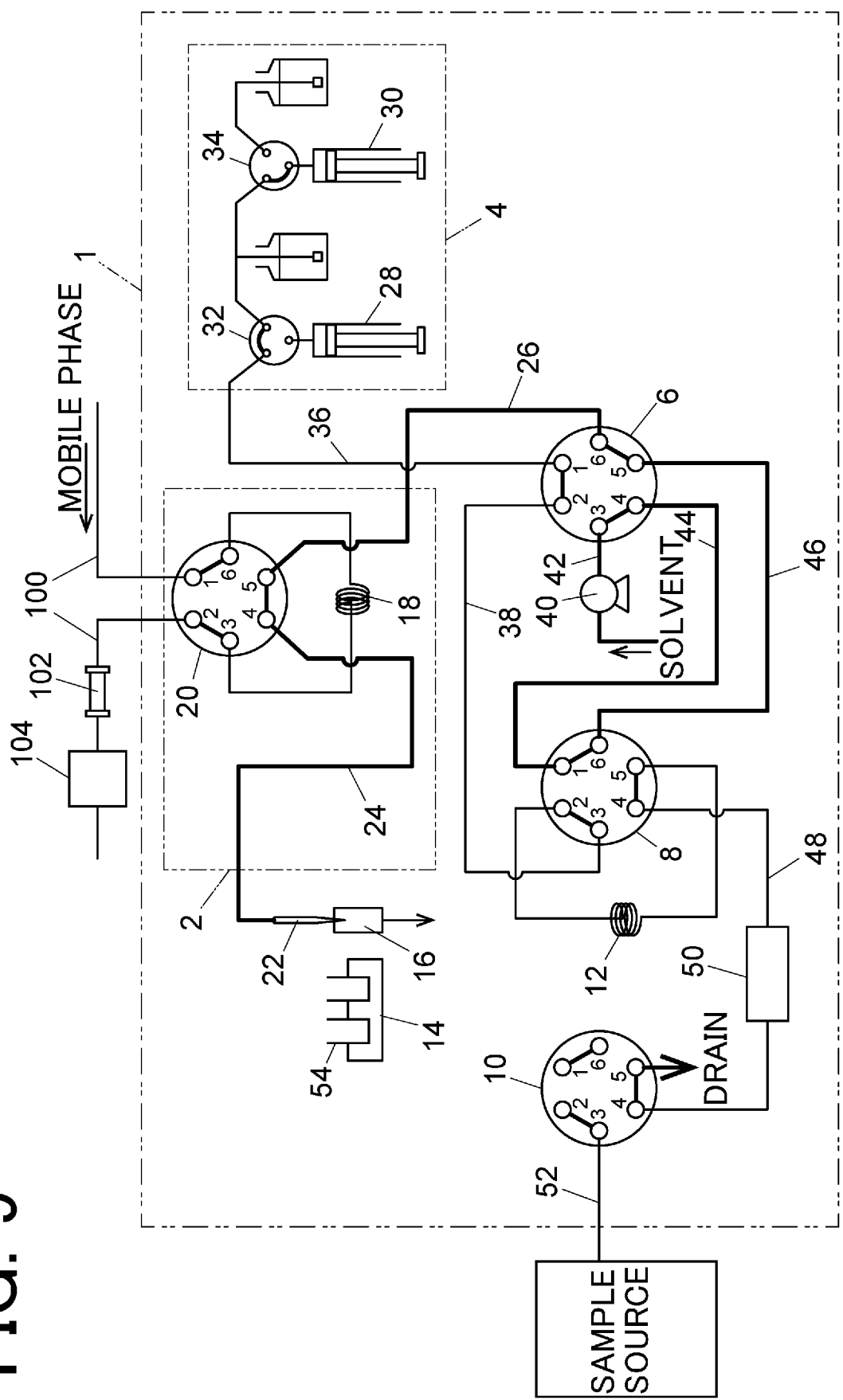
FIG. 9 is a diagram illustrating an example of a channel configuration when the inside of a channel is cleaned with a solvent supplied by a liquid feed pump in the example.

As illustrated in FIG. 9, a path for supplying the solvent from the liquid feed pump 40 to the injector 2 through the channels 44 and 46, and the sample supply channel 26 is constructed when the ports 3 and 4 of the switching valve 6, and the ports 5 and 6 of thereof, are caused to fluidly communicate with each other, and the ports 1 and 6 of the switching valve 8 are caused to fluidly communicate with each other. When the needle 22 of the injector 2 is caused to access the drain port 16 and the liquid feed pump 40 supplies the solvent to the injector 2 in this state, not only the channels 44 and 46, and the sample supply channel 26, but also the sample loop 18 and the sampling channel 24 of the injector 2, can be cleaned.

Operations of the injector 2, the pump part 4, the switching valves 6, 8, and 10, and the liquid feed pump 40 are controlled by the controller 17 (see FIG. 1). The controller 17 is a function implemented by executing a computer program in a computer device including a central processing part (CPU) and an information storage device. The controller 17 is configured to control the operations of the injector 2, the pump part 4, the switching valves 6, 8, and 10, and the liquid feed pump 40 to collect a sample from the sample source and supply the sample to the injector 2, perform pretreatment such as dilution of the sample as necessary, and then execute a sampling operation of injecting the sample into a mobile phase flowing through the analysis channel 100.

Figure 10:
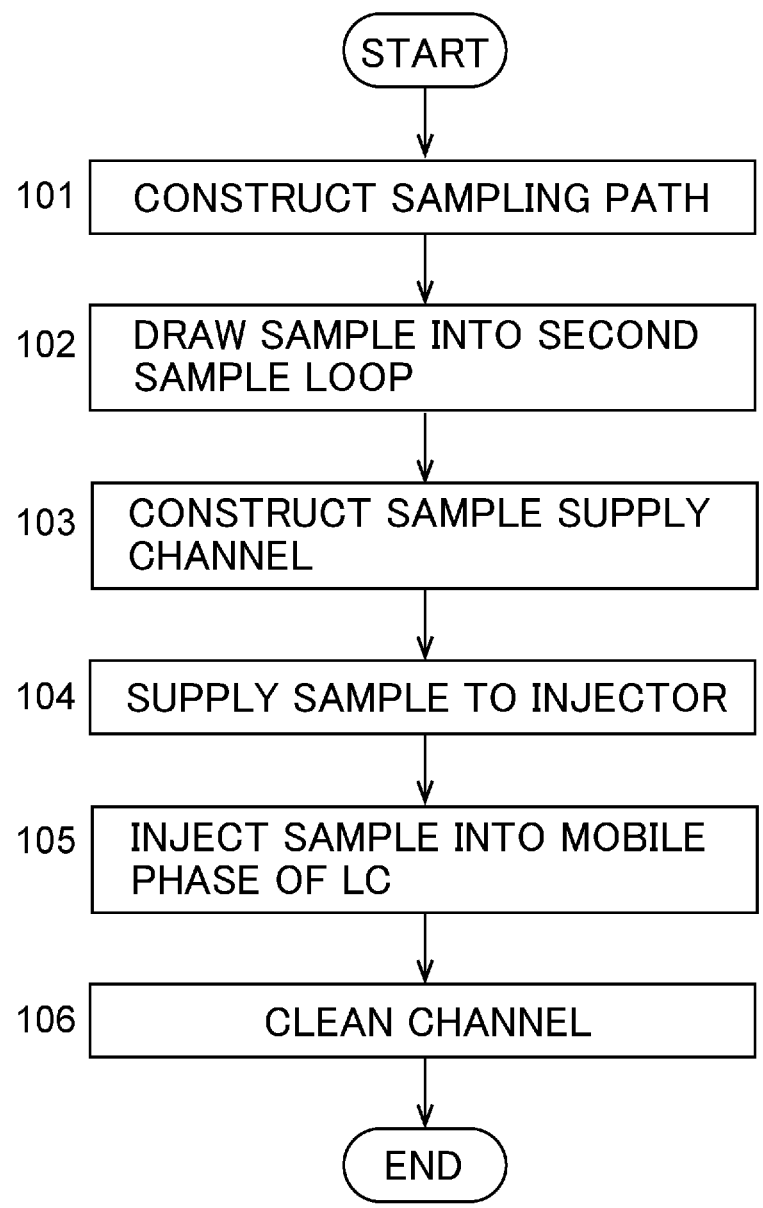
FIG. 10 is a flowchart for illustrating an example of a sampling operation of injecting a sample of a sample source into a mobile phase of an LC in the example.

FIG. 10 illustrates an example of the sampling operation.

The controller 17 causes the switching valves 6, 8, and 10 to construct the sampling path illustrated in FIG. 2 (step 101), and causes the sample of the sample source to be drawn into the sample loop 12 (second sample loop) by connecting any one of the syringe pumps 28 and 30 of the pump part 4 to the pump channel 36 and driving the pump to perform sucking (step 102).

Next, the controller 17 causes the switching valves 6, 8, and 10 to construct the sample supply path illustrated in FIG. 3 (step 103), and causes the liquid feed pump 40 to feed the solvent to supply the sample held in the sample loop 12 together with the solvent to the injector 2 through the sample supply channel 26 (step 104). At this time, the needle 22 of the injector 2 is caused to access the container 54 being empty of the container part 14 to temporarily store the sample and the solvent supplied to the injector 2 through the sample supply channel 26 in the empty container 54, and then the sample is diluted in the container 54.

After the sample and the solvent are stored in the container 54, an operation of stirring inside the container 54 can be performed as necessary. The stirring inside the container 54 can be performed by causing the ports 1 and 6 of the switching valve 6 to fluidly communicate with each other with the needle 22 having accessed the container 54, fluidly connecting any one of the syringe pumps 28 and 30 of the pump part 4 to the sampling channel 24, and causing the syringe pump 28 or 30 to repeatedly perform a sucking operation and a discharging operation. After that, when the needle 22 is caused to access the drain port 16 and a cleaning liquid is supplied from the pump part 4, the sample supply channel 26 and the sampling channel 24 can be cleaned (see FIG. 4).

After the sample and the solvent are stored in the container 54 and cleaning of the channels, for example, is performed as necessary, the controller 17 causes the sucking and discharging path with the sample loop 18 interposed between the pump part 4 and the sampling channel 24 to be constructed with the needle 22 having accessed the stored container 54, and then causes any one of the syringe pumps 28 and 30 of the pump part 4 to perform the sucking operation to draw the sample into the sample loop 18 (see FIG. 5). After that, the controller 17 injects the sample into the mobile phase of the LC by switching the injection port 20 to incorporate the sample loop 18 into the analysis channel 100 (step 105). After the sample is injected into the mobile phase of the LC, the controller 17 causes a cleaning path as illustrated in FIGS. 7 to 9 to be constructed as necessary to perform cleaning of the inside of each channel of the system 1 (step 106). Cleaning of the pretreatment part 50 using the pretreatment part cleaning path illustrated in FIGS. 7 and 8 can be performed at any time after the sample is supplied to the injector 2.

Although various fluid flow paths can be constructed by the path construction part including the three switching valves 6, 8, and 10 in the above example, the present invention is not limited thereto. That is, the online sampling system may be configured to enable constructing at least a sampling path capable of collecting a sample from the sample source to the sample loop 12 and a sample supply path capable of supplying a sample from the sample loop 12 to the injector 2 while a system including the sample source is always maintained as a closed system.

Figure 11:
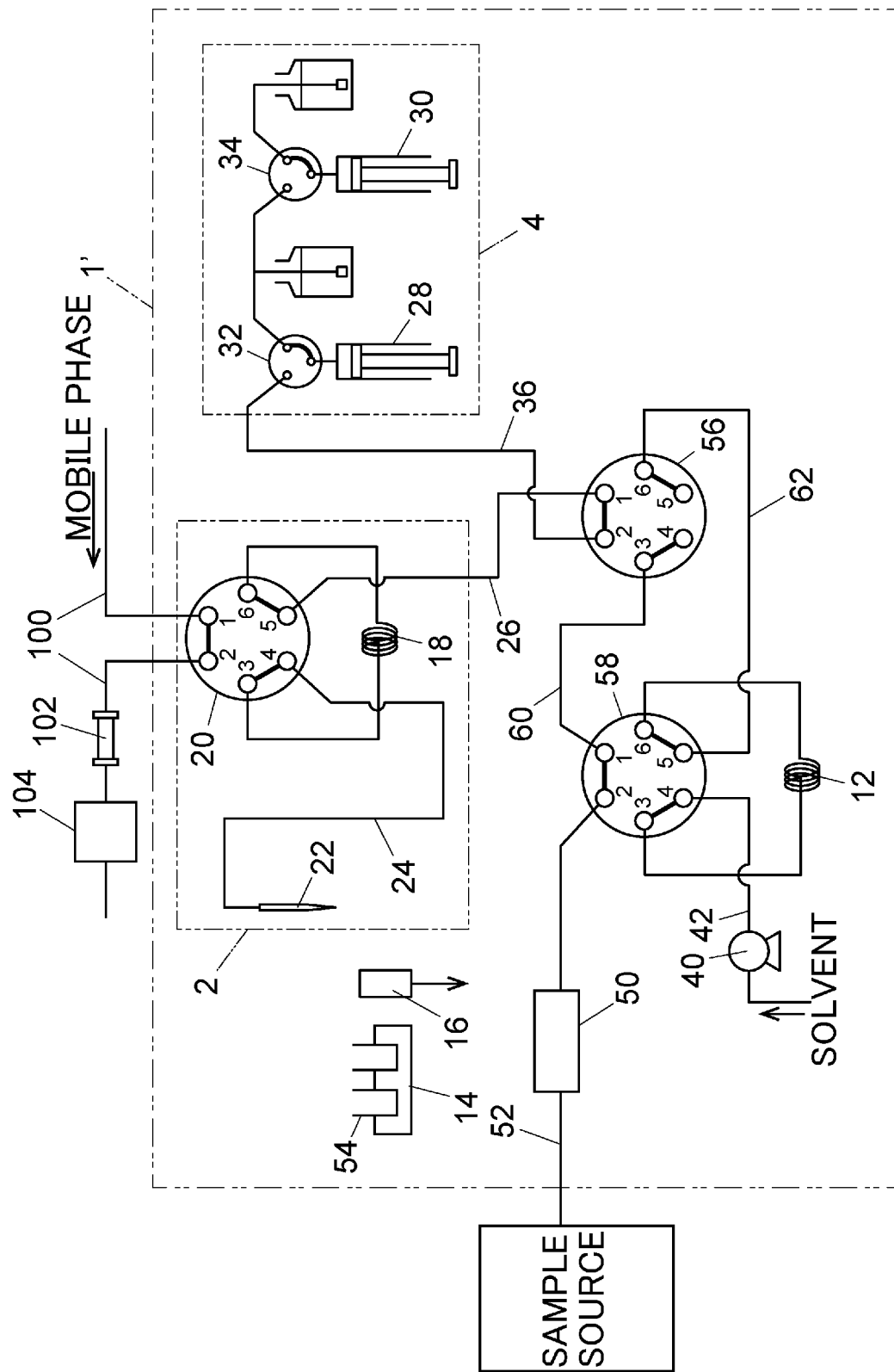
FIG. 11 is a channel configuration diagram illustrating another example of an online sampling system.

FIG. 11 is a configuration diagram illustrating another example of the online sampling system. The example described below denotes the same components as those of the online sampling system 1 described with reference to FIGS. 1 to 10 with the same reference numerals as those of FIGS. 1 to 10, and does not describe a detailed duplicated description thereof.

An online sampling system 1' of the present example includes a path construction part for constructing various fluid flow paths that is implemented by two switching valves 56 and 58.

Each of the switching valves 56 and 58 is a two-position valve including six ports 1 to 6 counterclockwise. The port 1 of the switching valve 56 is fluidly connected to a sample supply channel 26 communicating with an injector 2, and the port 2 of the switching valve 56 is fluidly connected to a pump channel 36 communicating with a pump part 4. The port 3 of the switching valve 56 fluidly communicates with the port 1 of the switching valve 58 via a channel 60, and the port 6 of the switching valve 56 fluidly communicates with the port 5 of the switching valve 58 via a channel 62. The ports 4 and 5 of the switching valve 56 are closed.

The port 2 of the switching valve 58 is fluidly connected to a sample source channel 52 communicating with a sample source. The sample source channel 52 is provided with a pretreatment part 50. The ports 3 and 6 of the switching valve 58 are fluidly connected to one end and the other end of a sample loop 12, respectively. The port 4 of the switching valve 58 is fluidly connected to a solvent supply channel 42 including a liquid feed pump 40.

Figure 12:
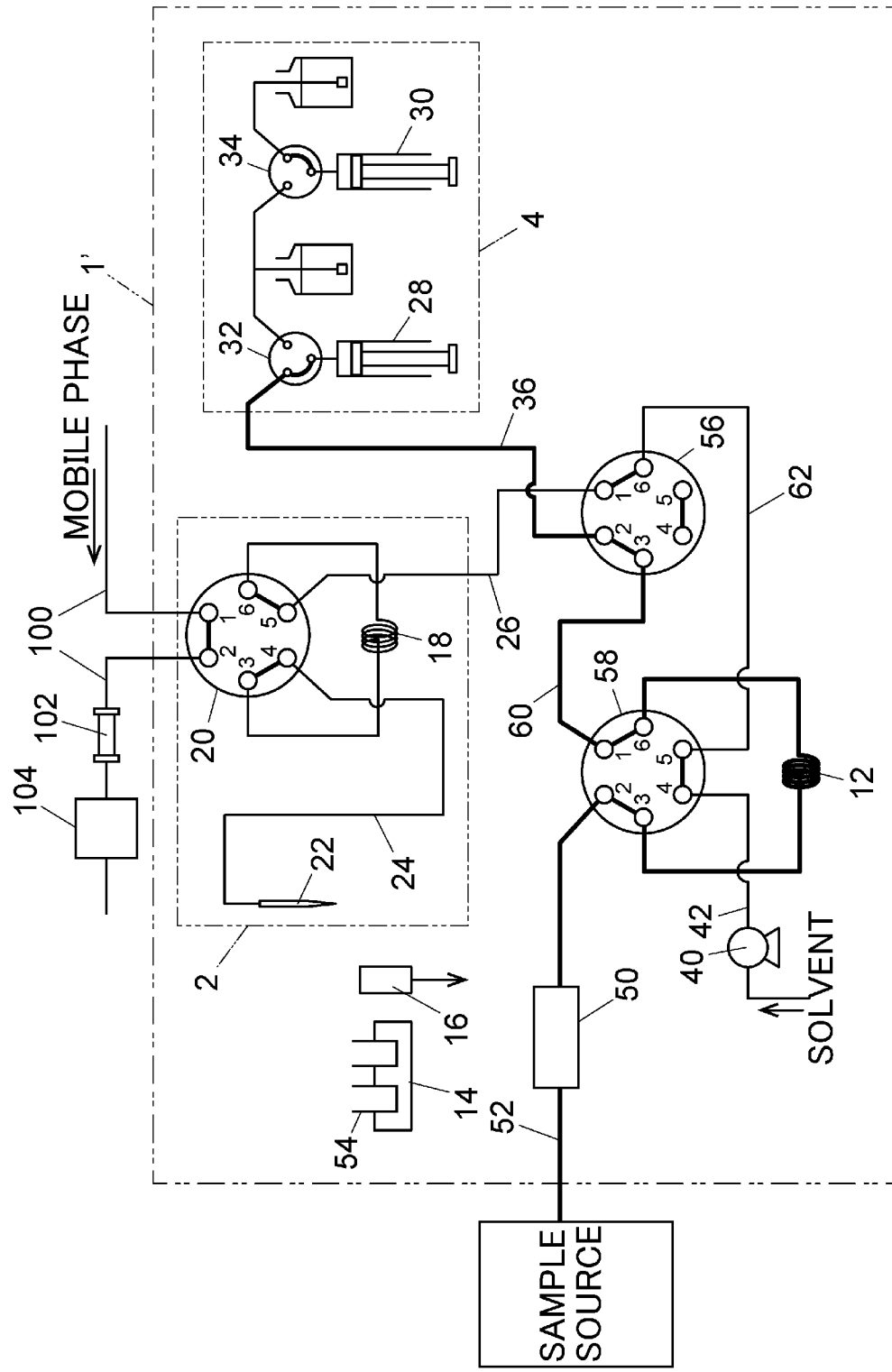
FIG. 12 is a diagram illustrating an example of a channel configuration when a sampling path is constructed in the other example.

As illustrated in FIG. 12, the online sampling system 1' includes a sampling path in which the pump part 4 fluidly communicate with the sample source channel 52 with the sample loop 12 interposed therebetween, the sampling path being constructed by causing the ports 2 and 3 of the switching valve 56 to fluidly communicate with each other, and the ports 1 and 2 of the switching valve 58, and the ports 2 and 3 thereof, to fluidly communicate with each other. When any one of syringe pumps 28 and 30 of the pump part 4 is driven to perform sucking in this state, a sample of the sample source can be drawn into the sample loop 12.

Figure 13:
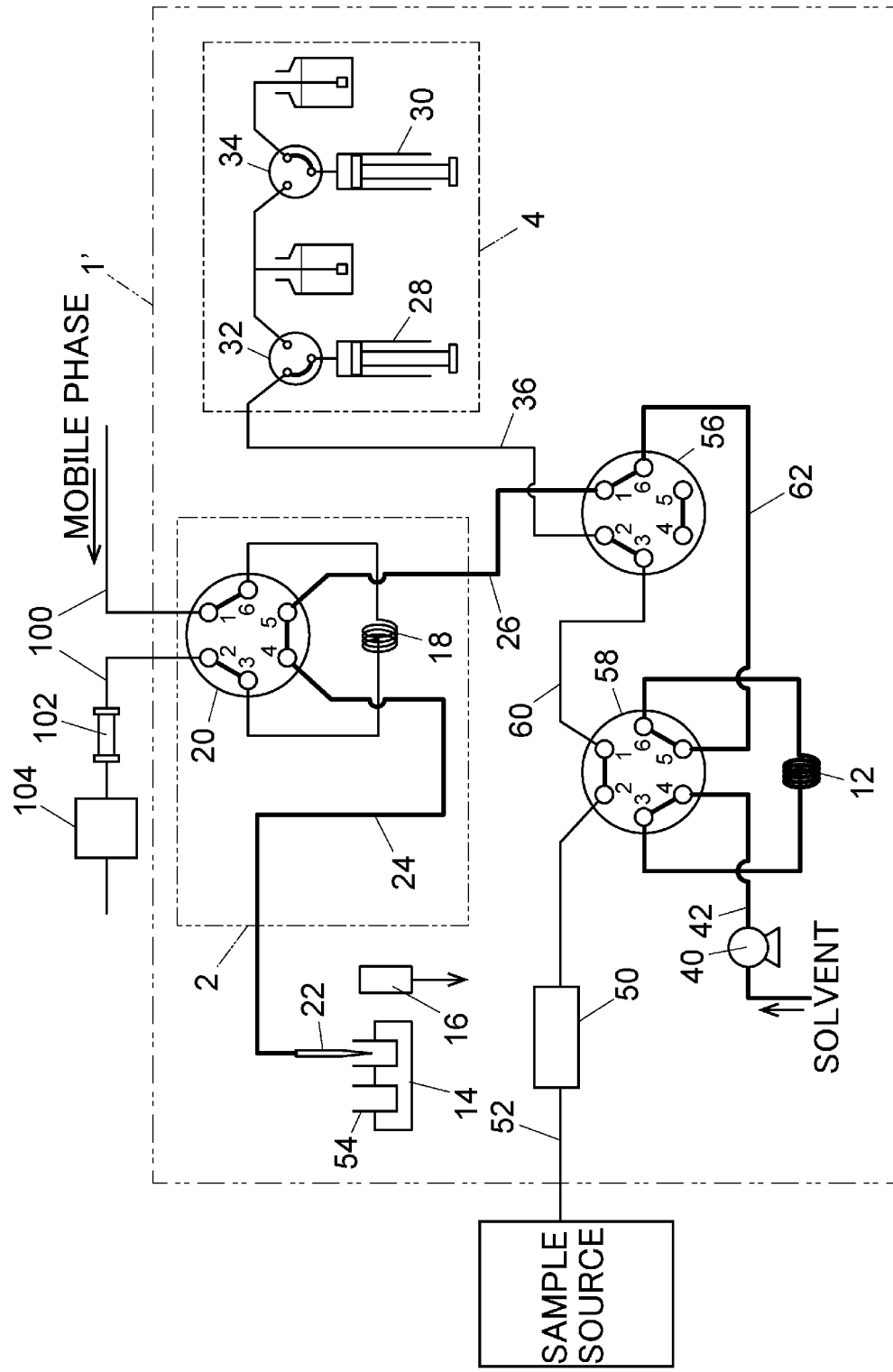
FIG. 13 is a diagram illustrating an example of a channel configuration when a sample supply path is constructed in the other example.

When the ports 1 and 6 of the switching valve 56 are caused to fluidly communicate with each other, and the ports 3 and 4 of the switching valve 58, and the ports 5 and 6 thereof, are caused to fluidly communicate with each other, as illustrated in FIG. 13, a sample supply path is constructed in which a solvent feed channel 42 fluidly communicate with the sample supply channel 26 with the sample loop 12 interposed therebetween. Feeding a solvent with the liquid feed pump 40 in these states enables the sample held in the sample loop 12 to be supplied to the injector 2 together with the solvent. At this time, the ports 4 and 5 of the injection valve 20 of the injector 2 is caused to fluidly communicate with each other and the needle 22 is caused to access the container 54 being empty set in the container 14, so that the sample and the solvent supplied to the injector 2 through the sample supply channel 26 can be stored in the container 54, and the sample can be diluted in the container 54. The sample has a dilution rate that can be adjusted by a liquid feed flow rate of the liquid feed pump 40. As another dilution method, the dilution rate can be adjusted during liquid feeding by changing pipe capacity of a channel. For example, in comparison between a pipe having a pipe capacity of 100 mL and a pipe having a pipe capacity of 50 mL, the sample is more diluted by using a pipe having the pipe capacity of 100 mL. That is, using a pipe having a pipe capacity corresponding to a target dilution rate for a channel enables further dilution than when a liquid feed flow rate of the liquid feed pump 40 is adjusted.

Although not illustrated in the drawing, the pump part 4 can fluidly communicate with a sampling channel 24 by causing the ports 1 and 2 of the switching valve 56 to fluidly communicate with each other, so that the sample stored in the container 54 can be drawn into the sample loop 18, or a cleaning liquid can be supplied from the pump part 4 toward the sampling channel 24 to clean the channel.

Figure 14:
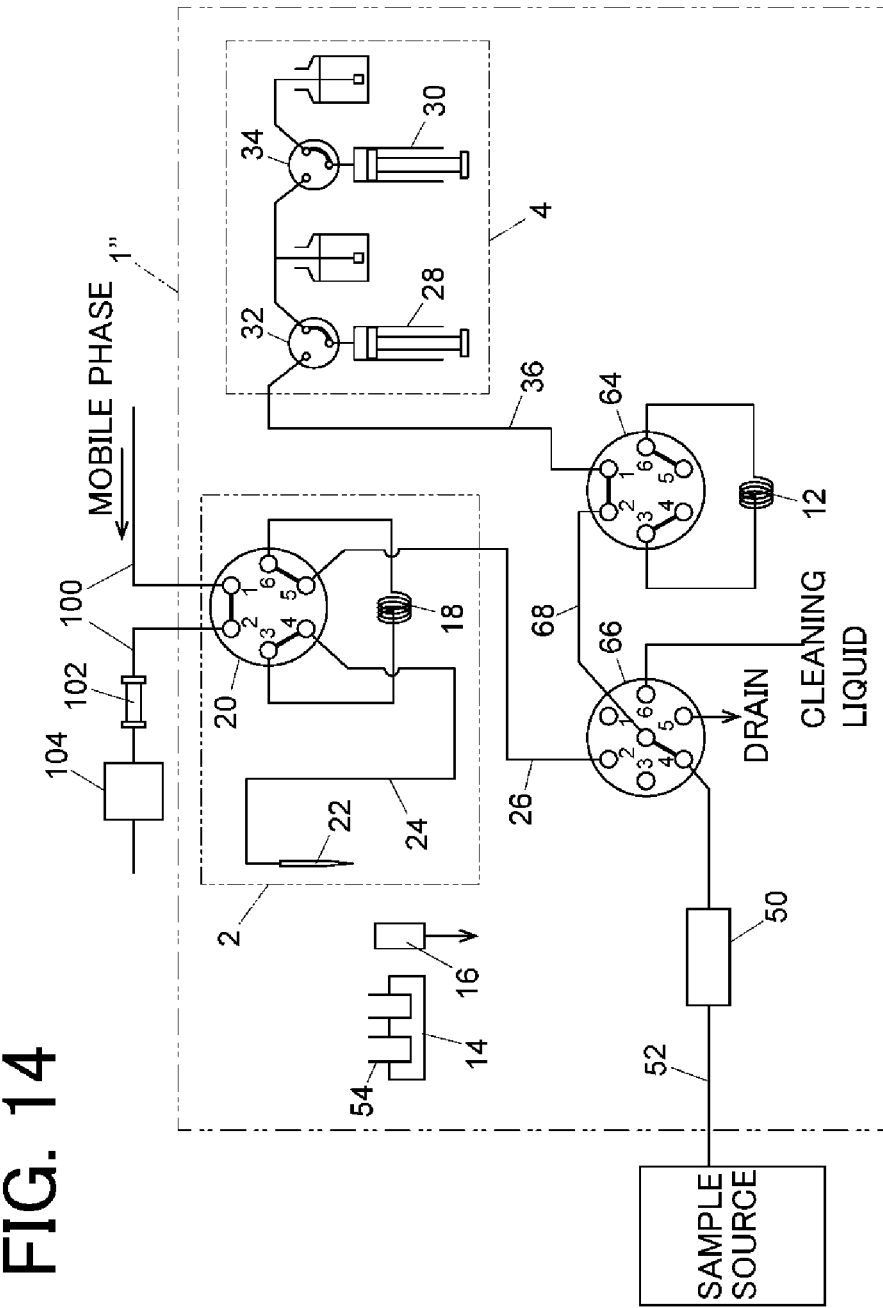
FIG. 14 is a channel configuration diagram illustrating yet another example of an online sampling system.

FIG. 14 is a configuration diagram illustrating yet another example of the online sampling system. The example described below also denotes the same components as those of the online sampling system 1 described with reference to FIGS. 1 to 10 with the same reference numerals as those of FIGS. 1 to 10, and does not describe a detailed duplicated description thereof.

An online sampling system 1″ of the present example includes a path construction part for constructing various fluid flow paths that is implemented by two switching valves 64 and 66.

The switching valve 64 is a two-position valve in which ports 1 to 6 are arranged counterclockwise. The switching valve 66 is a seven-port valve that is provided at its center with a common port and that includes the ports 1 to 6 arranged counterclockwise around the common port, and is configured to selectively causes the central port to fluidly communicate with any one of the ports 1 to 6.

The port 1 of the switching valve 64 is fluidly connected to a pump channel 36 communicating with a pump part 4, and the ports 3 and 6 of the switching valve 64 are fluidly connected to one end and the other end of a sample loop 12, respectively. The port 2 of the switching valve 64 fluidly communicates with the common port of the switching valve 66 via a channel 68. The ports 4 and 5 of the switching valve 64 are closed.

The port 2 of the switching valve 66 is fluidly connected to a sample supply channel 26 communicating with an injector 2, and the port 4 of the switching valve 66 is fluidly connected to a sample source channel 52. The sample source channel 52 is provided with a pretreatment part 50. The port 5 of the switching valve 66 communicates with a drain, and the port 6 communicates with a container for storing a cleaning liquid. The ports 1 and 3 of the switching valve 66 are closed.

Figure 15:
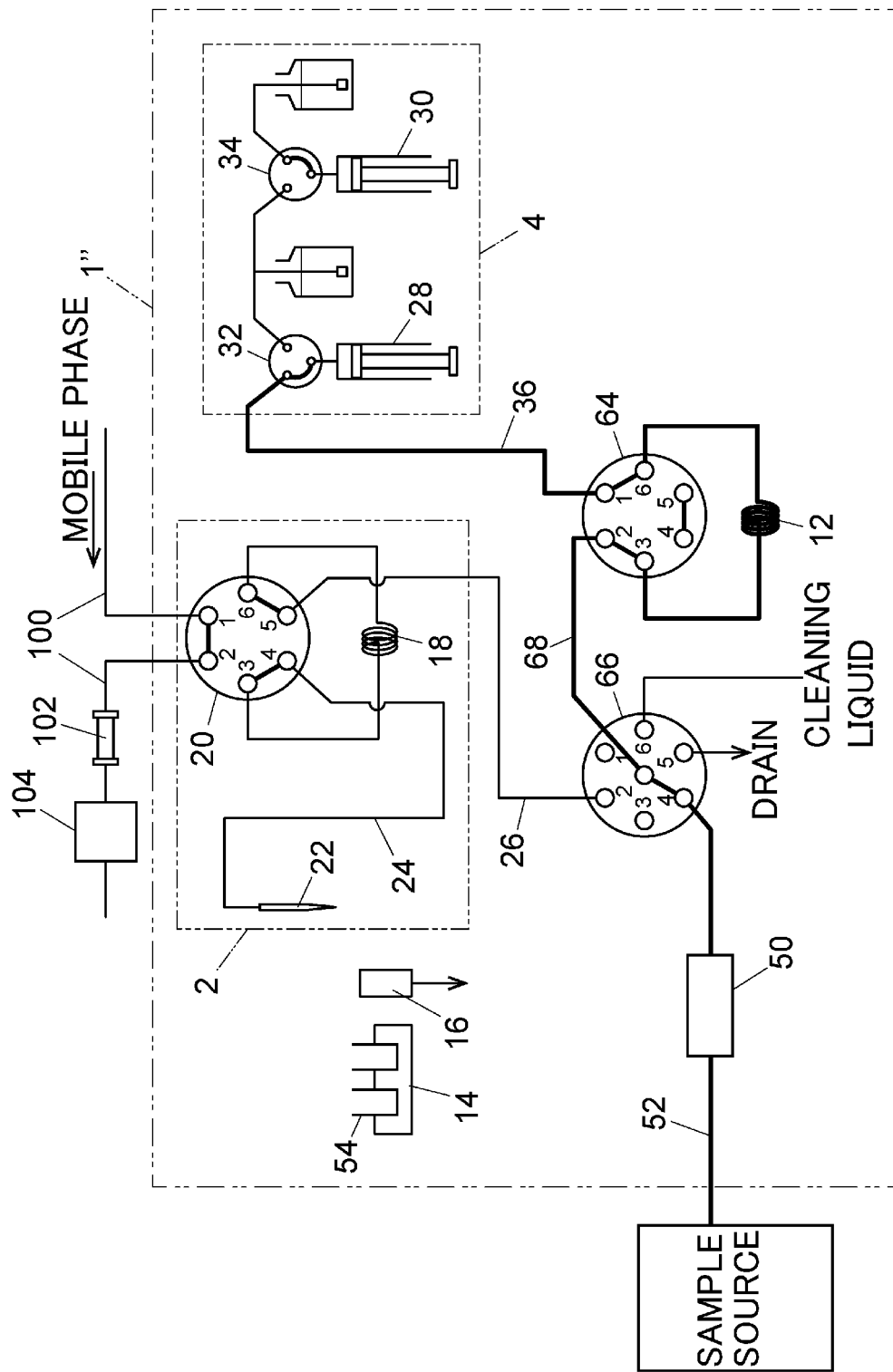
FIG. 15 is a diagram illustrating an example of a channel configuration when a sampling path is constructed in the yet other example.

As illustrated in FIG. 15, the online sampling system 1″ includes a sampling path in which the pump part 4 fluidly communicate with the sample source channel 52 with the sample loop 12 interposed therebetween, the sampling path being constructed by causing the ports 1 and 6 of the switching valve 64, and the ports 2 and 3 thereof, to fluidly communicate with each other, and the common port and the port 4 of the switching valve 66 to fluidly communicate with each other. When any one of syringe pumps 28 and 30 of the pump part 4 is driven to perform sucking in this state, a sample of the sample source can be drawn into the sample loop 12.

Figure 16:
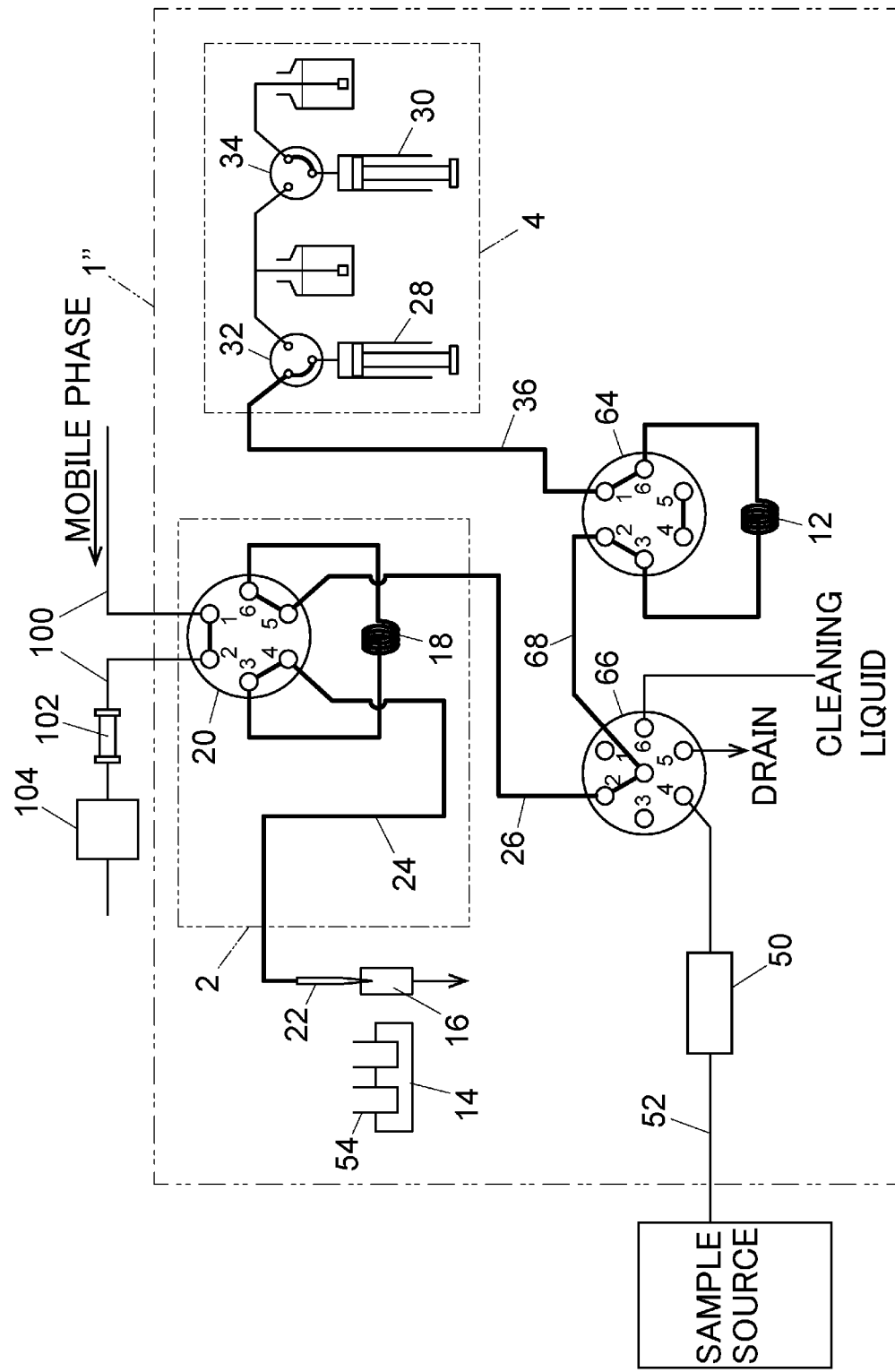
FIG. 16 is a diagram illustrating an example of a channel configuration when a sample supply path is constructed in the yet other example.

When the ports 1 and 6 of the switching valve 64, and the ports 2 and 3 thereof, are caused to fluidly communicate with each other, and the common port and the port 2 of the switching valve 66 are caused to fluidly communicate with each other, as illustrated in FIG. 16, a sample supply path is constructed in which the pump part 4 fluidly communicate with the sample supply channel 26 with the sample loop 12 interposed therebetween. When the pump part 4 is driven to push out the sample drawn into the sample loop 12 toward the sample supply channel 26 in this state, the sample held by the sample loop 12 can be supplied to the injector 2. At this time, the ports 3 and 4 of an injection valve 20 of the injector 2, and the ports 5 and 6 thereof, are caused to fluidly communicate with each other, and a needle 22 is caused to access a drain port 16, so that the sample supplied to the injector 2 through the sample supply channel 26 can be fed into a sample loop 18.

Figure 17:
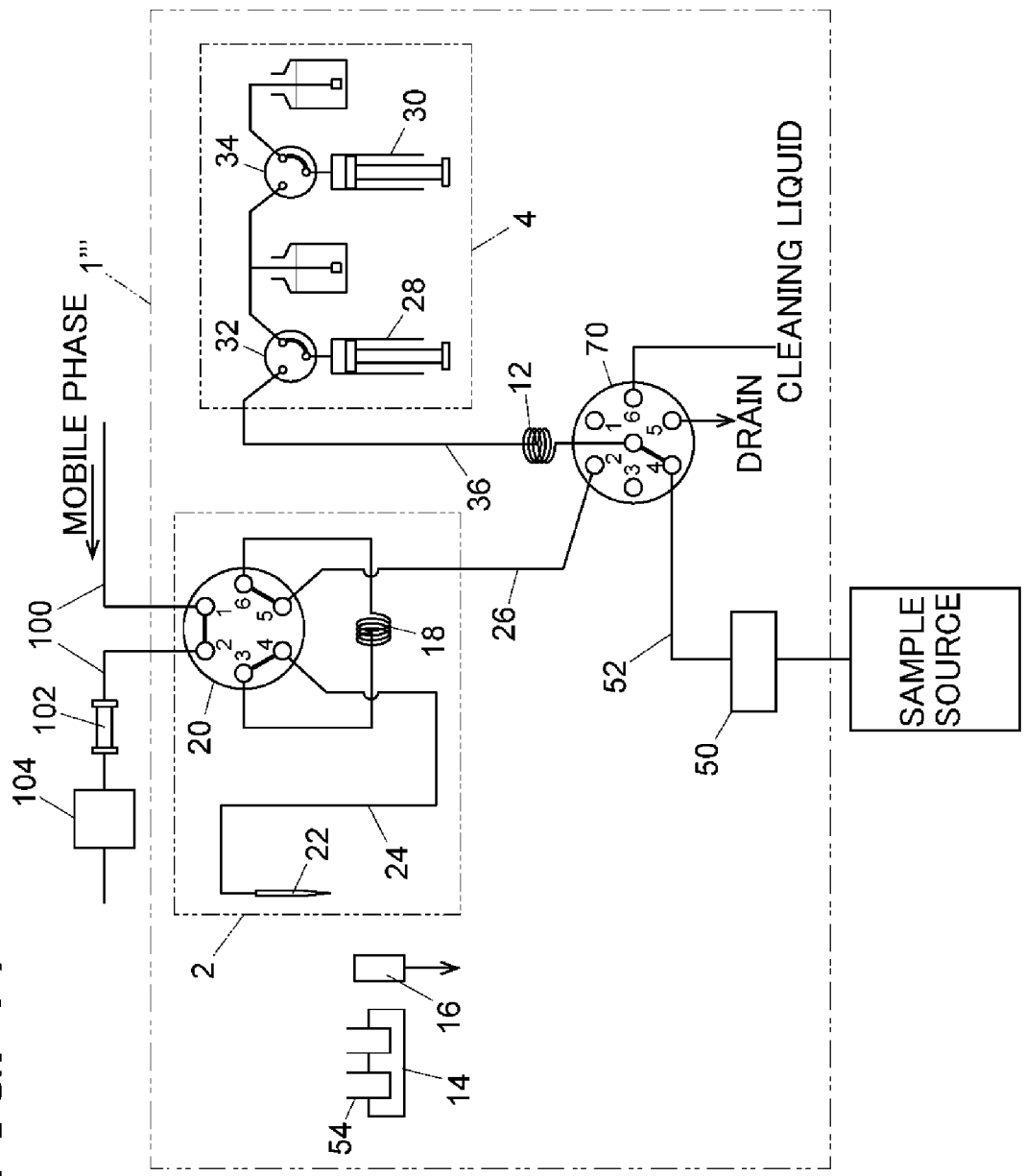
FIG. 17 is a channel configuration diagram illustrating still another example of an online sampling system.

FIG. 17 is a configuration diagram illustrating still another example of the online sampling system. The example described below also denotes the same components as those of the online sampling system 1 described with reference to FIGS. 1 to 10 with the same reference numerals as those of FIGS. 1 to 10, and does not describe a detailed duplicated description thereof.

An online sampling system 1‴ of the present example includes a path construction part for constructing various fluid flow paths that is implemented by only one switching valve 70.

The switching valve 70 is a seven-port valve that is provided at its center with a common port and that includes ports 1 to 6 arranged counterclockwise around the common port, and is configured to selectively causes the central port to fluidly communicate with any one of the ports 1 to 6.

The common port of the switching valve 70 is fluidly connected to a pump channel 36 communicating with a pump part 4. The pump channel 36 is provided with a sample loop 12. The port 2 of the switching valve 70 is fluidly connected to a sample supply channel 26 communicating with an injector 2, and the port 4 of the switching valve 70 is fluidly connected to a sample source channel 52. The sample source channel 52 is provided with a pretreatment part 50, and pretreatment such as filtering is performed on a sample flowing through the sample source channel 52. The port 5 of the switching valve 70 communicates with a drain, and the port 6 communicates with a container for storing a cleaning liquid. The ports 1 and 3 of the switching valve 70 are closed.

Figure 18:
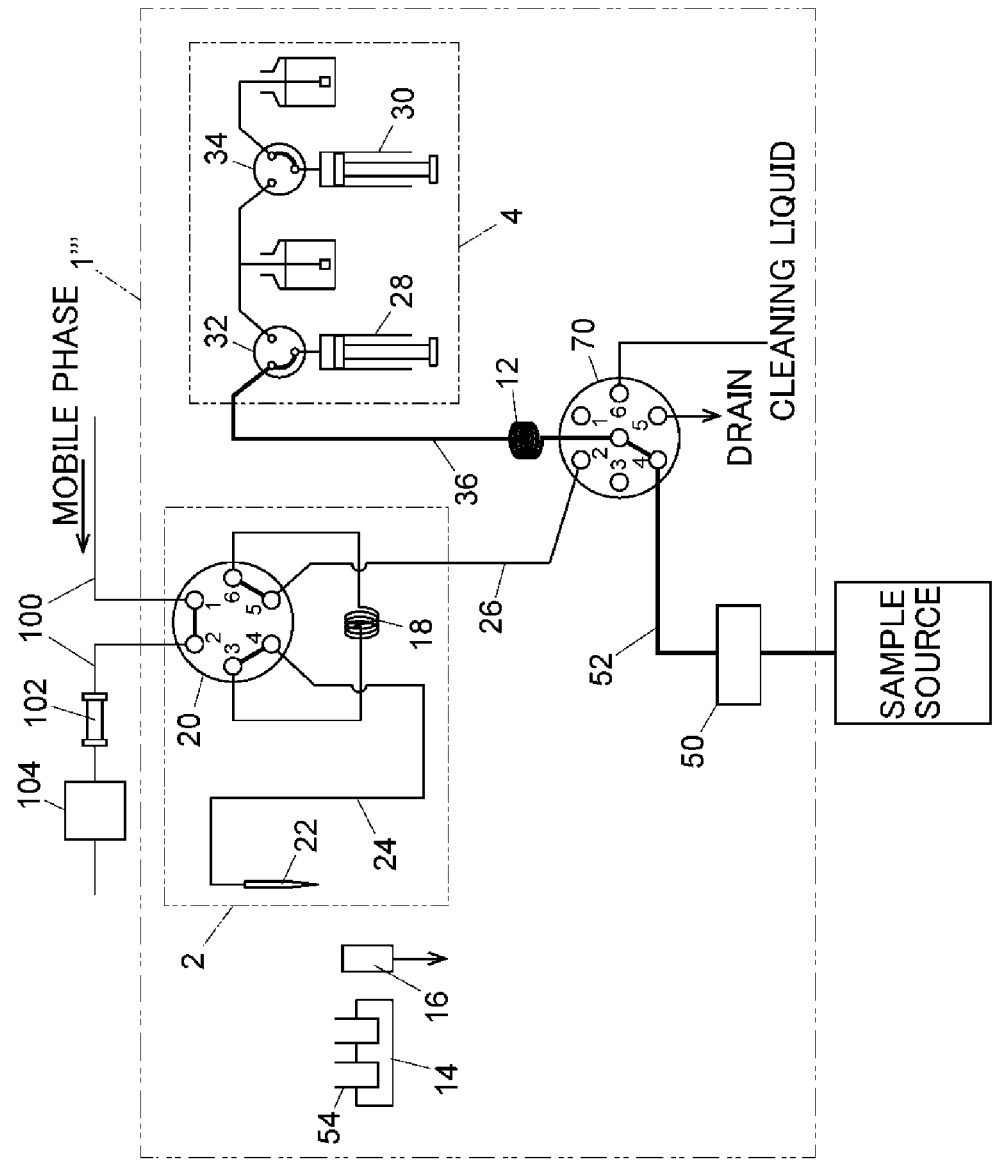
FIG. 18 is a diagram illustrating an example of a channel configuration when a sampling path is constructed in the still other example.

As illustrated in FIG. 18, the online sampling system 1‴ includes a sampling path in which the pump part 4 fluidly communicate with the sample source channel 52 with the sample loop 12 interposed therebetween, the sampling path being constructed by causing the common port and the port 4 of the switching valve 70 to fluidly communicate with each other. When any one of syringe pumps 28 and 30 of the pump part 4 is driven to perform sucking in this state, a sample of the sample source can be drawn into the sample loop 12.

Figure 19:
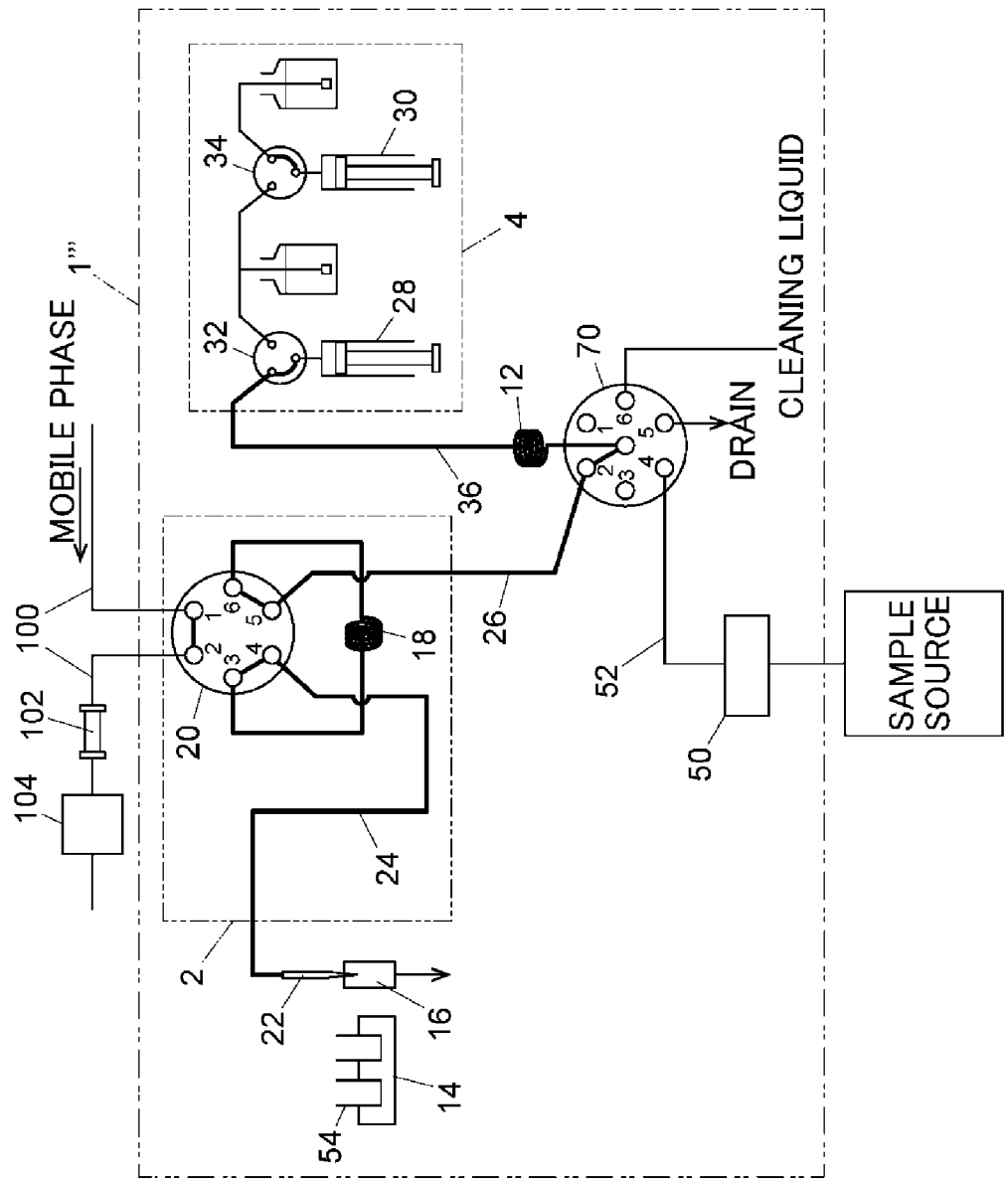
FIG. 19 is a diagram illustrating an example of a channel configuration when a sample supply path is constructed in the still other example.

When the common port and the port 2 of the switching valve 70 are caused to fluidly communicate with each other as illustrated in FIG. 19, a sample supply path is constructed in which the pump part 4 fluidly communicate with the sample supply channel 26 with the sample loop 12 interposed therebetween. When the pump part 4 is driven to push out the sample drawn into the sample loop 12 toward the sample supply channel 26 in this state, the sample held by the sample loop 12 can be supplied to the injector 2. At this time, the ports 3 and 4 of an injection valve 20 of the injector 2, and the ports 5 and 6 thereof, are caused to fluidly communicate with each other, and a needle 22 is caused to access a drain port 16, so that the sample supplied to the injector 2 through the sample supply channel 26 can be fed into a sample loop 18.

The examples described above are merely examples of embodiments of the online sampling system according to the present invention. The embodiments of the online sampling system according to the present invention are as follows.

An online sampling system according to an embodiment of the present invention is configured to collect a sample from a sample source and to inject the sample into a mobile phase flowing through an analysis channel of a liquid chromatograph, the online sampling system including:
- an injector including a first sample loop for temporarily holding a sample and an injection valve for switching between a state in which the first sample loop is incorporated in the analysis channel and a state in which the first sample loop is separated from the analysis channel;
- a sample supply channel fluidly connected to the injector and configured to supply the sample to the injector;
- a pump part configured to suck and discharge a liquid;
- a second sample loop provided separately from the first sample loop;
- a sample source channel communicating with the sample source;
- a path construction part including one or more switching valves, the path construction part being configured to selectively build multiple fluid flow paths in the online sampling system by switching the one or more switching valves.

The path construction part is configured to be capable of selectively constructing paths a sampling path and a sample supply path,
- the sampling path is configured so that the sample source channel and the pump part are fluidly connected to each other in a closed system with the second sample loop interposed therebetween and the sample is drawn from the sample source to the second sample loop using the pump part, and
- the sample supply path is configured so that the second sample loop is separated from the sample source channel while maintaining a closed system state of the sample source channel and the pump part or another pump different from the pump part and the sample supply channel are fluidly connected to each other with the second sample loop interposed therebetween and the sample held in the second sample loop is supplied to the injector through the sample supply channel using the pump part or the other pump.

The embodiment includes a first aspect in which the one or more switching valves include one switching valve having a first port and a second port, the sample supply channel is provided to fluidly connect the first port of the one switching valve and one port of the injection valve, and the pump part is fluidly connected to the second port of the one switching valve.

The embodiment includes a second aspect configured such that the other pump is provided to feed a solvent, and the online sampling system is configured so that the other pump and the sample supply channel are fluidly connected to each other with the second sample loop interposed therebetween when the path construction part constructs the sample supply path, and thereby, the sample held in the second sample loop is supplied to the injector together with the solvent fed by the other pump.

The second aspect includes a specific aspect in which the online sampling system further includes a container part in which a container for containing a sample is set, the injector includes a sampling channel having a tip provided with a needle for accessing the container set in the container part to suck a liquid from the container and discharging the liquid to the container, and the injector is configured so that the sample supply channel and the sampling channel may be connected to each other, thereby, it can be achieved that the sample and the solvent supplied through the sample supply channel are stored in the container by fluidly connecting the sample supply channel to the container when the path construction part constructs the sample supply path. Such an aspect enables a sample collected from the sample source to be automatically diluted.

The above specific aspect that enables a sample to be automatically diluted is configured such that the sample supply channel and the sampling channel always fluidly communicate with each other via the injection valve, and the first sample loop is interposed between the sample supply channel and the sampling channel when the first sample loop is disconnected from the analysis channel, and the path construction part is configured so that selectively construct a sucking and discharging path, which is for the pump part to suck and discharge a liquid through the needle, may be selectively constructed by fluidly connecting the pump part to the sample supply channel. Such an aspect enables a sample to be sucked from the container via the needle using the pump part and drawn into the first sample loop. As a result, all of a series of sampling operations such as collecting a sample from the sample source, diluting the collected sample, and injecting the diluted sample into the LC, can be performed online.

The embodiment includes a third aspect in which a pretreatment channel is provided, including a pretreatment part that performs pretreatment on a sample drawn from the sample source toward the second sample loop, the pretreatment channel being interposed between the second sample loop and the sample source channel when the sampling path is constructed, and the path construction part is configured to selectively construct a pretreatment part cleaning path for supplying the solvent to the pretreatment part using the other pump by fluidly connecting the liquid feed pump and the pretreatment channel while disconnecting the pretreatment channel from the sample source channel and connecting the pretreatment channel to a drain. Such an aspect enables the pretreatment part to be cleaned with the pretreatment channel separated from the sample source channel.

Examples of the pretreatment part include a filter for removing substances unnecessary for analysis from a sample, and a remelting device for remelting a sample precipitated in a channel.

The third aspect may be configured such that the path construction part is configured to allow the second sample loop to be interposed between the liquid feed pump and the pretreatment channel when the pretreatment part cleaning path is constructed. This configuration enables the second sample loop to be cleaned simultaneously with the pretreatment part.

The embodiment includes a fourth aspect that further includes a controller configured to control operations of the injector, the pump part, and the path construction part, and also control an operation of the other pump when the other pump is provided,
the controller being configured to perform the following:
- a sampling step of constructing the sampling path and drawing a sample of the sample source into the second sample loop to hold the sample;
- a sample supply step of constructing the sample supply path after the sampling step is completed to supply the sample held in the second sample loop to the injector using the pump part or the other pump; and
- an injection step of injecting the sample into the mobile phase by incorporating the first sample loop holding the sample into the analysis channel after the sample supply step is completed.

The embodiment includes a fifth aspect that further includes a controller configured to control operations of the injector, the pump part, the other pump, and the path construction part, the controller being configured to perform the following:
a sampling step of constructing the sampling path and drawing a sample of the sample source into the second sample loop to hold the sample;
a sample dilution step of constructing the sample supply path after the sampling step is completed, causing the sample supply channel and the sampling channel to fluidly communicate with each other and the needle to access the container being empty, and supplying the sample held in the second sample loop using the other pump to the container together with the solvent to dilute the sample in the container;
a sample sucking step of constructing the sucking and discharging path by fluidly connecting the pump part to the sample supply channel while interposing the first sample loop between the sample supply channel and the sampling channel after the sample dilution step is completed, and drawing the sample diluted in the container into the first sample loop using the pump part; and
an injection step of injecting the sample into the mobile phase by incorporating the first sample loop holding the sample into the analysis channel after the sample sucking step is completed.

DESCRIPTION OF REFERENCE SIGNS 1, 1', 1", 1'" online sampling system
2 injector
4 pump part
6, 8, 10, 32, 34, 56, 58, 64, 66, 70 switching valve
12 sample loop (second sample loop)
14 container part
16 drain port
18 sample loop (first sample loop)
20 injection port
22 needle
24 sampling channel
26 sample supply channel
28, 30 syringe pump
36 pump channel
38, 44, 46, 60, 62, 68 channel
40 liquid feed pump
42 solvent supply channel
48 pretreatment channel
50 pretreatment part
52 sample source channel
54 container

What is claimed is:

1. An online sampling system configured to collect a sample from a sample source and to inject the sample into a mobile phase flowing through an analysis channel of a liquid chromatograph, the online sampling system comprising:
an injector including a first sample loop for temporarily holding a sample and an injection valve for switching between a state in which the first sample loop is incorporated in the analysis channel and a state in which the first sample loop is separated from the analysis channel;
a sample supply channel fluidly connected to the injector and configured to supply the sample to the injector;
a pump part configured to suck and discharge a liquid;
a second sample loop provided separately from the first sample loop;
a sample source channel communicating with the sample source;
a path construction part including one or more switching valves, the path construction part being configured to selectively build multiple fluid flow paths in the online sampling system by switching the one or more switching valves, wherein
the path construction part being configured to be capable of selectively constructing a sampling path and a sample supply path,
the sampling path is configured so that the sample source channel and the pump part are fluidly connected to each other in a closed system with the second sample loop interposed therebetween and the sample is drawn from the sample source to the second sample loop using the pump part, and
the sample supply path is configured so that the second sample loop is separated from the sample source channel while maintaining a closed system state of the sample source channel and the pump part or another pump different from the pump part and the sample supply channel are fluidly connected to each other with the second sample loop interposed therebetween and the sample held in the second sample loop is supplied to the injector through the sample supply channel using the pump part or the other pump.

2. The online sampling system according to claim 1, wherein
the one or more switching valves includes one switching valve having a first port and a second port,
the sample supply channel is provided to fluidly connect the first port of the one switching valve and one port of the injection valve, and
the pump part is fluidly connected to the second port of the one switching valve.

3. The online sampling system according to claim 1, wherein
the other pump is provided to feed a solvent, and
the online sampling system is configured so that the other pump and the sample supply channel are fluidly connected to each other with the second sample loop interposed therebetween when the path construction part constructs the sample supply path, and thereby, the sample held in the second sample loop is supplied to the injector together with the solvent fed by the other pump.

4. The online sampling system according to claim 3, further comprising:
a container part in which a container for containing a sample is set,
wherein the injector includes a sampling channel having a tip provided with a needle for accessing the container set in the container part to suck a liquid from the container and discharging the liquid to the container, and the injector is configured so that the sample supply channel and the sampling channel may be connected to each other, thereby, it can be achieved that the sample and the solvent supplied through the sample supply channel are stored in the container by fluidly connecting the sample supply channel to the container when the path construction part constructs the sample supply path.

5. The online sampling system according to claim 4, further comprising:

a controller configured to control operations of the injector, the pump part, the other pump, and the path construction part,
the controller being configured to perform the following:
a sampling step of constructing the sampling path and drawing a sample of the sample source into the second sample loop to hold the sample;
a sample dilution step of constructing the sample supply path after the sampling step is completed, causing the sample supply channel and the sampling channel to fluidly communicate with each other and the needle to access the container being empty, and supplying the sample held in the second sample loop using the other pump to the container together with the solvent to dilute the sample in the container;
a sample sucking step of constructing the sucking and discharging path by fluidly connecting the pump part to the sample supply channel while interposing the first sample loop between the sample supply channel and the sampling channel after the sample dilution step is completed, and drawing the sample diluted in the container into the first sample loop using the pump part; and
an injection step of injecting the sample into the mobile phase by incorporating the first sample loop holding the sample into the analysis channel after the sample sucking step is completed.

6. The online sampling system according to claim 4, wherein
the sample supply channel and the sampling channel always fluidly communicate with each other via the injection valve, and the first sample loop is interposed between the sample supply channel and the sampling channel when the first sample loop is disconnected from the analysis channel, and
the path construction part is configured so that a sucking and discharging path, which is for the pump part to suck and discharge a liquid through the needle, may be selectively constructed by fluidly connecting the pump part to the sample supply channel.

7. The online sampling system according to claim 1, further comprising:
a pretreatment channel including a pretreatment part that performs pretreatment on a sample drawn from the sample source toward the second sample loop, the pretreatment channel being interposed between the second sample loop and the sample source channel when the sampling path is constructed,
wherein the path construction part is configured to selectively construct a pretreatment part cleaning path for supplying the solvent to the pretreatment part using the other pump by fluidly connecting the liquid feed pump and the pretreatment channel while disconnecting the pretreatment channel from the sample source channel and connecting the pretreatment channel to a drain.

8. The online sampling system according to claim 7, wherein the pretreatment part is a filter for removing substances unnecessary for analysis from a sample, or a remelting device for remelting a sample precipitated in a channel.

9. The online sampling system according to claim 7, wherein the path construction part is configured to allow the second sample loop to be interposed between the liquid feed pump and the pretreatment channel when the pretreatment part cleaning path is constructed.

10. The online sampling system according to claim 1, further comprising:
a controller configured to control operations of the injector, the pump part, and the path construction part, and also control an operation of the other pump when the other pump is provided,
the controller being configured to perform the following:
a sampling step of constructing the sampling path and drawing a sample of the sample source into the second sample loop to hold the sample;
a sample supply step of constructing the sample supply path after the sampling step is completed to supply the sample held in the second sample loop to the injector using the pump part or the other pump; and
an injection step of injecting the sample into the mobile phase by incorporating the first sample loop holding the sample into the analysis channel after the sample supply step is completed.

* * * * *